(12) United States Patent
VanderZanden et al.

(10) Patent No.: US 11,263,690 B2
(45) Date of Patent: Mar. 1, 2022

(54) ON-DEMAND RENTAL OF ELECTRIC VEHICLES

(71) Applicant: Bird Rides, Inc., Santa Monica, CA (US)

(72) Inventors: Travis VanderZanden, Santa Monica, CA (US); William Scott Rushforth, Los Angeles, CA (US)

(73) Assignee: Bird Rides, Inc., Santa Monica, CA (US)

( * ) Notice: Subject to any disclaimer, the term of this patent is extended or adjusted under 35 U.S.C. 154(b) by 301 days.

(21) Appl. No.: 16/544,537

(22) Filed: Aug. 19, 2019

(65) Prior Publication Data

US 2020/0058065 A1 Feb. 20, 2020

Related U.S. Application Data

(60) Provisional application No. 62/765,299, filed on Aug. 20, 2018.

(51) Int. Cl.
*G06Q 30/06* (2012.01)
*G08G 1/00* (2006.01)
*G07C 5/08* (2006.01)
*G07C 5/00* (2006.01)
*H04W 4/40* (2018.01)

(52) U.S. Cl.
CPC ......... *G06Q 30/0645* (2013.01); *G07C 5/008* (2013.01); *G07C 5/0841* (2013.01); *G08G 1/205* (2013.01); *H04W 4/40* (2018.02)

(58) Field of Classification Search
CPC ...... G06Q 30/0645; H04W 4/40; H04W 4/90; G07C 5/008; G07C 5/0841; G08G 1/205
See application file for complete search history.

(56) References Cited

U.S. PATENT DOCUMENTS

| | | | |
|---|---|---|---|
| 6,378,815 B1 | 4/2002 | Lee | |
| 6,472,771 B1 | 10/2002 | Frese | |
| 6,850,898 B1 | 2/2005 | Murakami | |
| 6,941,197 B1 | 9/2005 | Murakami | |
| 6,947,881 B1 | 9/2005 | Murakami | |
| 8,627,990 B2 | 1/2014 | Nakajima | |
| 8,635,091 B2* | 1/2014 | Amigo | G07C 5/008 705/4 |

(Continued)

FOREIGN PATENT DOCUMENTS

| | | |
|---|---|---|
| CN | 102013137 | 4/2011 |
| CN | 204706096 | 10/2015 |

(Continued)

OTHER PUBLICATIONS

YouTube video titled Electric Scooter Sharing Service Makes Its Way to DC, available at https://www.youtube.com/watch?v=Kyoo8afD5hE, published on Mar. 1, 2018.

(Continued)

*Primary Examiner* — Hoi C Lau

(74) *Attorney, Agent, or Firm* — Van Pelt, Yi & James LLP

(57) ABSTRACT

A location associated with an on-demand electric vehicle is determined dynamically during a ride to be associated with one or more restrictions. Configuration data is used to enforce the one or more restrictions with respect to operation of the on-demand electric vehicle in connection with the ride.

18 Claims, 12 Drawing Sheets

(56) References Cited

U.S. PATENT DOCUMENTS

| | | |
|---|---|---|
| 8,662,528 B1 | 3/2014 | Abdulaziz |
| 8,727,192 B2 | 5/2014 | Lai |
| 8,738,212 B1* | 5/2014 | Schieffelin ............... B62M 6/40 |
| | | 701/22 |
| 8,849,237 B2 | 9/2014 | Bourdu |
| 8,918,231 B2 | 12/2014 | Rovik |
| 8,983,704 B2* | 3/2015 | Schieffelin ................. B62J 9/00 |
| | | 701/22 |
| 8,998,048 B1 | 4/2015 | Wu |
| 9,045,102 B2 | 6/2015 | Caratto |
| 9,168,975 B1* | 10/2015 | Schieffelin ............... B62M 6/90 |
| 9,171,268 B1 | 10/2015 | Penilla |
| 9,189,900 B1 | 11/2015 | Penilla |
| 9,194,168 B1 | 11/2015 | Lu |
| 9,229,623 B1 | 1/2016 | Penilla |
| 9,288,270 B1 | 3/2016 | Penilla |
| 9,415,833 B2* | 8/2016 | Schieffelin ............ B60W 40/12 |
| 9,569,966 B2 | 2/2017 | Bobbitt |
| 9,586,559 B2 | 3/2017 | Keating |
| 9,586,599 B2 | 3/2017 | Filev |
| 9,656,672 B2* | 5/2017 | Schieffelin ............... B62M 6/45 |
| 9,738,255 B2 | 8/2017 | Keating |
| 10,023,266 B2* | 7/2018 | Contello .................. B62M 9/06 |
| 10,086,796 B2 | 10/2018 | Keating |
| 10,109,006 B2* | 10/2018 | Yan ........................ B60L 53/665 |
| 10,262,484 B2 | 4/2019 | Conrad |
| 10,358,133 B2* | 7/2019 | Schieffelin ............. B62M 9/132 |
| 10,434,985 B2 | 10/2019 | Keating |
| 10,607,492 B2* | 3/2020 | VanderZanden ........ G08G 1/202 |
| 10,974,782 B2* | 4/2021 | Foley ...................... B62J 50/225 |
| 11,100,346 B2* | 8/2021 | Beaurepaire ........ G06K 9/00825 |
| 2002/0174077 A1 | 11/2002 | Yui |
| 2002/0186144 A1 | 12/2002 | Meunier |
| 2003/0078707 A1* | 4/2003 | Shioda .................. B60W 10/04 |
| | | 701/22 |
| 2004/0012261 A1 | 1/2004 | Albert |
| 2004/0075541 A1 | 4/2004 | Simoneau |
| 2004/0108348 A1 | 6/2004 | Barnes |
| 2004/0119610 A1 | 6/2004 | Maemura |
| 2006/0108167 A1 | 5/2006 | Finger |
| 2007/0045495 A1 | 3/2007 | Asano |
| 2007/0168104 A1* | 7/2007 | Nelson .................... G08G 1/207 |
| | | 701/93 |
| 2007/0285209 A1 | 12/2007 | Heusi |
| 2008/0179478 A1 | 7/2008 | Lee |
| 2008/0201160 A1 | 8/2008 | Chang |
| 2009/0052071 A1 | 2/2009 | Chang |
| 2010/0075656 A1 | 3/2010 | Howarter |
| 2010/0089846 A1 | 4/2010 | Navarro Ruiz |
| 2010/0228405 A1* | 9/2010 | Morgal .................... B60L 53/68 |
| | | 701/2 |
| 2011/0054735 A1 | 3/2011 | Kamiya |
| 2011/0060480 A1 | 3/2011 | Mottla |
| 2011/0112969 A1 | 5/2011 | Zaid |
| 2011/0184789 A1 | 7/2011 | Kirsch |
| 2011/0213629 A1 | 9/2011 | Clark |
| 2012/0000720 A1 | 1/2012 | Honda |
| 2012/0286950 A1 | 11/2012 | Peariso |
| 2012/0330696 A1 | 12/2012 | Clark |
| 2013/0030581 A1 | 1/2013 | Luke |
| 2013/0030696 A1 | 1/2013 | Wu |
| 2013/0093585 A1 | 4/2013 | Ambani |
| 2013/0099892 A1* | 4/2013 | Tucker .................... H04W 4/80 |
| | | 340/5.61 |
| 2013/0116892 A1 | 5/2013 | Wu |
| 2013/0134196 A1 | 5/2013 | Lee |
| 2013/0144482 A1 | 6/2013 | Tuukkanen |
| 2013/0164572 A1 | 6/2013 | Liao |
| 2013/0238167 A1 | 9/2013 | Stanfield |
| 2013/0317693 A1 | 11/2013 | Jefferies |
| 2013/0321178 A1 | 12/2013 | Jameel |
| 2013/0325521 A1 | 12/2013 | Jameel |
| 2014/0163774 A1 | 6/2014 | Demeniuk |
| 2014/0163797 A1* | 6/2014 | Schieffelin .............. G01S 19/01 |
| | | 701/22 |
| 2014/0172192 A1 | 6/2014 | Kato |
| 2014/0172727 A1 | 6/2014 | Abhyanker |
| 2014/0188310 A1* | 7/2014 | Hatfield ................. B25J 9/1633 |
| | | 701/2 |
| 2014/0200742 A1 | 7/2014 | Mauti, Jr. |
| 2014/0218533 A1 | 8/2014 | Cloudparc |
| 2014/0222298 A1 | 8/2014 | Gurin |
| 2014/0343773 A1* | 11/2014 | Schieffelin ................. B62J 9/00 |
| | | 701/22 |
| 2015/0046022 A1 | 2/2015 | Bai |
| 2015/0291253 A1* | 10/2015 | Schieffelin ................ G06F 9/00 |
| | | 701/22 |
| 2015/0339595 A1 | 11/2015 | Soutter |
| 2015/0339923 A1 | 11/2015 | König |
| 2015/0370253 A1 | 12/2015 | Gurin |
| 2016/0027307 A1 | 1/2016 | Abhyanker |
| 2016/0048777 A1 | 2/2016 | Kitagawa |
| 2016/0176472 A1* | 6/2016 | Schieffelin ............... B62M 6/90 |
| | | 701/22 |
| 2016/0180721 A1 | 6/2016 | Otulic |
| 2016/0311334 A1* | 10/2016 | Moravick ............... B60L 58/12 |
| 2017/0004712 A1* | 1/2017 | Yang .................... H04L 67/025 |
| 2017/0008451 A1 | 1/2017 | Stanfield |
| 2017/0039631 A1* | 2/2017 | Luke .................. G06Q 30/0645 |
| 2017/0039668 A1* | 2/2017 | Luke .................... G06Q 10/06 |
| 2017/0061709 A1 | 3/2017 | Toya |
| 2017/0106866 A1* | 4/2017 | Schieffelin ............... B62J 99/00 |
| 2017/0282919 A1* | 10/2017 | Schieffelin ............... B62M 6/45 |
| 2017/0364995 A1* | 12/2017 | Yan ........................ B60L 53/31 |
| 2018/0009414 A1 | 1/2018 | Keating |
| 2018/0056791 A1 | 3/2018 | Lee |
| 2018/0238698 A1* | 8/2018 | Pedersen ............ G01C 21/3469 |
| 2019/0102858 A1* | 4/2019 | Pivnick .............. G01C 21/3484 |
| 2019/0248439 A1* | 8/2019 | Wang ...................... B60L 53/80 |
| 2019/0311630 A1* | 10/2019 | VanderZanden ........ G08G 1/202 |
| 2019/0318419 A1* | 10/2019 | VanderZanden ... G06Q 30/0645 |
| 2019/0324446 A1* | 10/2019 | VanderZanden ...... G05D 1/0291 |
| 2020/0058065 A1* | 2/2020 | VanderZanden ... G06Q 30/0645 |
| 2020/0124430 A1* | 4/2020 | Bradlow ................. B62J 99/00 |
| 2020/0180718 A1* | 6/2020 | Foley ......................... B62J 6/01 |
| 2020/0180719 A1* | 6/2020 | Chadwick ............... B62H 5/14 |
| 2020/0210729 A1* | 7/2020 | Beaurepaire ......... G06K 9/4604 |
| 2020/0250975 A1* | 8/2020 | Tang .................. G06K 9/00791 |
| 2020/0258393 A1* | 8/2020 | VanderZanden ... G01C 21/3667 |
| 2020/0356107 A1* | 11/2020 | Wells ...................... G06K 9/627 |
| 2021/0023952 A1* | 1/2021 | Sussna ............... B60L 15/2045 |
| 2021/0035032 A1* | 2/2021 | Foley ................. G06Q 30/0645 |
| 2021/0116581 A1* | 4/2021 | Cooper .................... G01S 19/40 |
| 2021/0125499 A1* | 4/2021 | Cooper ............... G06Q 30/0627 |
| 2021/0247196 A1* | 8/2021 | Wells ............... G01C 21/3438 |

FOREIGN PATENT DOCUMENTS

| | | |
|---|---|---|
| CN | 102667655 | 10/2016 |
| CN | 206737501 U | 12/2017 |
| EP | 1271418 | 1/2003 |
| FR | 2801994 | 1/2002 |
| JP | 2000337917 | 12/2000 |
| JP | 2003058989 | 2/2003 |
| JP | 2004312376 | 11/2004 |
| JP | 2005163522 | 6/2005 |
| JP | 2005277632 | 10/2005 |
| JP | 2007331725 | 12/2007 |
| JP | 2008189261 | 8/2008 |
| JP | 2011154420 | 8/2011 |
| JP | 2011228841 | 11/2011 |
| KR | 20070017860 | 2/2007 |
| WO | 0161604 | 8/2001 |
| WO | 2014052329 | 4/2014 |
| WO | 2017217936 | 12/2017 |

OTHER PUBLICATIONS

Scoot Networks (Demo Pit)-Launch Festival 2012 Presentation. LaunchConf. Scoot Networks. Published Mar. 14, 2012. https://www.youtube.com/watch?v=p5BlyBeTgzE.

(56) References Cited

OTHER PUBLICATIONS

European Search Report and Opinion dated Jun. 1, 2016 for EP Application No. 13842184.
Examination Report No. 1 for AU Application No. 2013323782 dated Oct. 12, 2018.
International Preliminary Report on Patentability and Written Opinion dated Feb. 3, 2014 for PCT Application No. US2013/061465.
International Search Report and Written Opinion dated Feb. 3, 2014 for PCT Application No. US2013/061465.
Notice of Allowance dated Apr. 18, 2017 for U.S. Appl. No. 15/411,916.
Notice of Allowance dated Oct. 24, 2016 for U.S. Appl. No. 14/668,781.
Office Action dated Apr. 1, 2016 for U.S. Appl. No. 14/668,781.
Office Action dated Aug. 31, 2016 for U.S. Appl. No. 14/668,781.
U.S. Appl. No. 15/653,275 Notice of Allowance dated May 18, 2018.
U.S. Appl. No. 15/653,275 Office Action dated Jan. 12, 2018.

* cited by examiner

ON-DEMAND RENTAL OF ELECTRIC VEHICLES

CROSS REFERENCE TO OTHER APPLICATIONS

This application claims priority to U.S. Provisional Patent Application No. 62/765,299 entitled ON-DEMAND RENTAL OF ELECTRIC VEHICLES filed Aug. 20, 2018 which is incorporated herein by reference for all purposes.

BACKGROUND OF THE INVENTION

An on-demand electric vehicle may be rented by a user via the user's mobile device. An application associated with the on-demand electric vehicle provider may be installed on the user's mobile device. The user may use the on-demand electric vehicle provider's application to rent the on-demand electric vehicle. During a rental period, the user may travel to any location for which the rented on-demand electric vehicle has sufficient charge.

BRIEF DESCRIPTION OF THE DRAWINGS

Various embodiments of the invention are disclosed in the following detailed description and the accompanying drawings.

DETAILED DESCRIPTION

Figure 1:
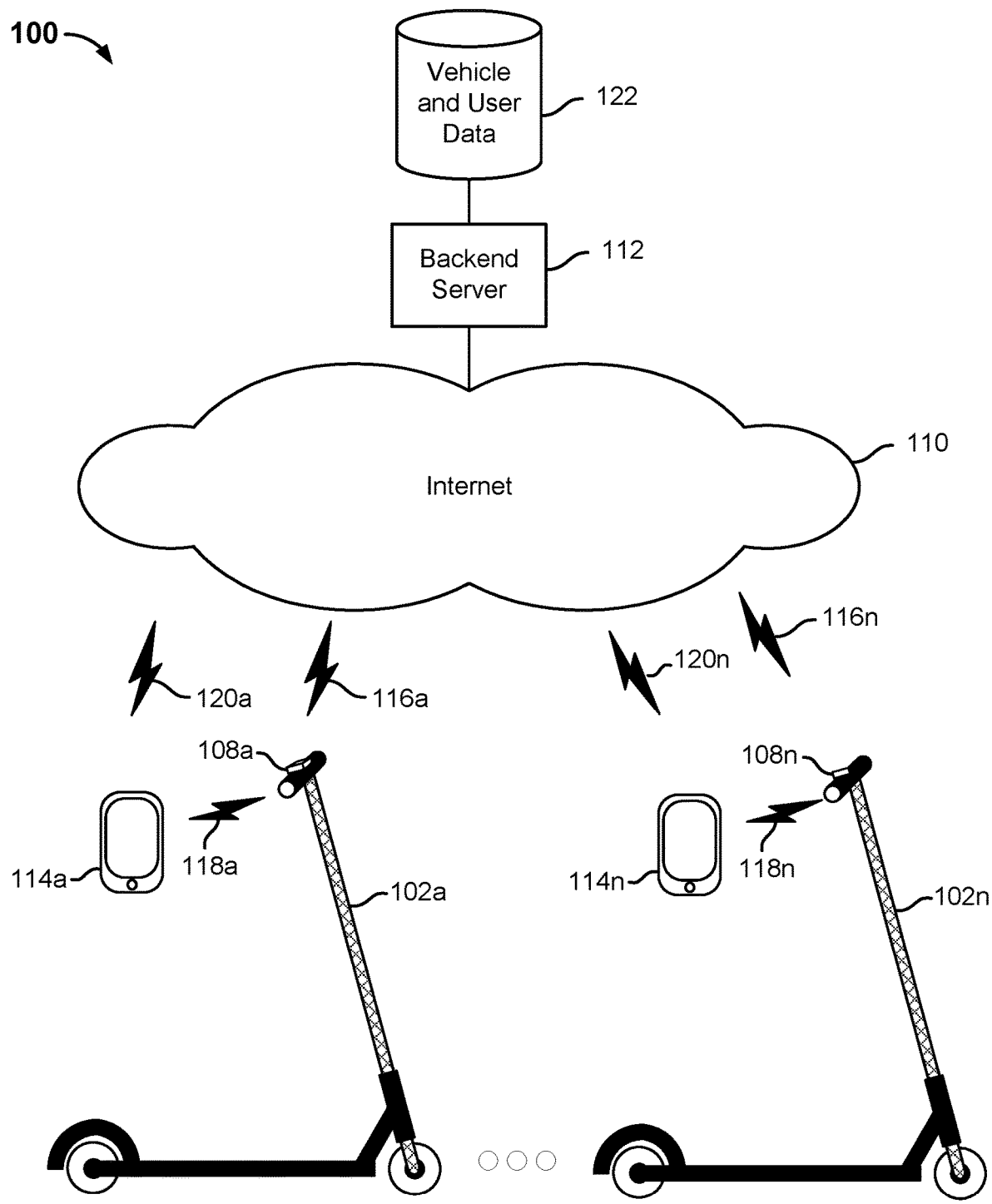
FIG. 1 is a block diagram illustrating an embodiment of a system to provide on-demand electric vehicles.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The use of on-demand electric vehicles has proliferated over the past couple of years. Examples of on-demand electric vehicles include, but are not limited to, electric scooters, electric bikes, minibikes, motor scooters, motorcycles, skateboards, hover boards, other single- or multi-wheeled electrically-powered boards, and self-balancing personal electric vehicles. A user may rent an on-demand electric vehicle through a mobile app associated with the on-demand electric vehicle provider hosted on the user's mobile device. After the user has rented the on-demand electric vehicle, the user is free to use the electric vehicle as the user desires.

However, use of electric vehicles may not be permitted in some contexts and/or restrictions may be placed on their use in some contexts. For example, municipalities may pass regulations to regulate the use of electric vehicles, e.g., prohibiting or restricting use in certain areas and/or at certain times of day or based on other conditions. Users may not be aware of and/or may not follow such restriction. For example, a user may attempt to ride the electric vehicle through prohibited area (e.g., a beach boardwalk, a park, sidewalk, etc.). An area may be marked via one or more signs indicating that electric vehicles are prohibited or restricted to a stated maximum speed, but users may disregard the signage. A user may ride the electric vehicle at an inappropriate speed for a particular context (e.g., time of day, location, weather, traffic conditions, etc.).

Techniques to enforce restrictions on the use of on-demand electric vehicles are disclosed. In various embodiments, an on-demand electric vehicle may configured and/or reconfigured after a user has initiated a rental of the on-demand electric vehicle to prevent the user from using the on-demand electric vehicle in an undesirable manner. For example, operation of the on-demand electric vehicle may be restricted to prevent use in a prohibited area. The maximum speed of the on-demand electric vehicle may be reduced based on the particular context (e.g., location, time of day, weather, traffic conditions, etc.)

Techniques are disclosed to ensure on-demand electric vehicles remain parked in an upright position. After the user has finished a rental of the on-demand electric vehicle, the electric vehicle may be placed in an upright position. Subsequently, the on-demand electric vehicle may be tipped over (either accidentally or on-purpose). The on-demand electric vehicle may remain in a fallen position until someone fixes the position of the fallen on-demand electric vehicle (i.e., place the fallen electric vehicle in an upright position). Fallen on-demand electric vehicles may be viewed as a nuisance because they may be blocking sidewalks, pathways, or doorways. In various embodiments, an indication may be received that one or more electric vehicles are not in an upright position. One or more fixers may be provided a notification via a user interface of the application associated with the on-demand electric vehicle provider. The term "fixer" may refer a person that corrects a position of an electric vehicle from a fallen position to an upright position. The notification may indicate a location of the fallen on-demand electric vehicle(s) and for each a corresponding incentive for a fixer to correct an orientation of an on-demand electric vehicle from a fallen position to an upright position. The orientation of an on-demand electric vehicle may be fixed to prevent the on-demand electric vehicle from continuing to block sideways, pathways, or doorways.

On-demand electric vehicles may not be tied to a particular docking station. This may allow a user to leave an on-demand electric vehicle in at any location after renting the on-demand electric vehicle. In some embodiments, the location is a low-demand zone (e.g., an area having a frequency of users below a first demand threshold). In some embodiments, the location is a high-saturation zone (e.g., an area having a number of on-demand electric vehicles available for rental greater than or equal to a saturation threshold). In some embodiments, the location is high theft/vandalism zone (e.g., an area having a number of theft/vandalism incidents greater than or equal to a theft/vandalism threshold.)

Leaving an on-demand electric vehicle in one of these zones may lead to an inefficient use of the on-demand electric vehicle because the on-demand electric vehicle may remain un-used until it is picked up and relocated to another location. For example, leaving an on-demand electric vehicle in a low demand zone may cause the on-demand electric vehicle to remain unused for an extended period of time because demand for on-demand electric vehicles at the particular location is low. Leaving an on-demand electric vehicle in a high-saturation zone may lead to an inefficient use of the on-demand electric vehicle because there are too many on-demand electric vehicles for a particular location despite the demand for on-demand electric vehicles. Leaving an on-demand electric vehicle in a high theft/vandalism zone may lead to an inefficient use of the on-demand electric vehicle because a theft of the on-demand electric vehicle prevents any potential users from renting the on-demand electric vehicle and vandalism causes damage to the on-demand electric vehicle, which renders the on-demand electric vehicle unavailable for use until the damage is repaired.

Techniques to relocate one or more electric vehicles to achieve a desired distribution of vehicles are disclosed. In various embodiments, one or more "rebalancers" may be provided a notification via a user interface of the application associated with the on-demand electric vehicle provider. The term "rebalancer" may refer a person that relocates an electric vehicle from a first location (e.g., an inefficient use zone) to a second location (e.g., efficient use zone). The notification may indicate a location of the on-demand electric vehicle and a corresponding incentive for a rebalancer to relocate an on-demand electric vehicle from a first location to a second location. The on-demand electric vehicle may be relocated to a different location to prevent the inefficient use of the on-demand electric vehicle.

FIG. 1 is a block diagram illustrating an embodiment of a system to provide on-demand electric vehicles. In the example shown, the system 100 includes a fleet of electric vehicles represented by electric vehicles 102a, 102n. Examples of electric vehicles include, but are not limited to, electric scooters, electric bikes, minibikes, motor scooters, motorcycles, skateboards, hover boards, other single- or multi-wheeled electrically-powered boards, and self-balancing personal electric vehicles. Although two electric vehicles are depicted in FIG. 1A, the electric fleet may be comprised of n electric vehicles. The plurality of electric vehicles are available for use "on demand."

Electric vehicles 102a, 102n and other vehicles in the fleet are propelled by an electric motor (not shown) powered by a battery (not shown), e.g. a battery in the foot board and/or located elsewhere in scooter. The batteries of electric vehicles 102a, 102n are depleted through use. Charger equipment (not shown) plugged into a power outlet or other power source (not shown) may be used to charge the battery of an electric vehicle.

Each vehicle is equipped with a corresponding computer system (e.g., computer systems 108a, 108n) comprising a communication functionality, such as WiFi, Bluetooth, GPS, cellular, etc., enabling the vehicle to connect directly or indirectly (e.g., via a user's mobile device) via the Internet 110 to a backend server 112. The connection may be via a direct wireless connection (e.g., direct wireless connections 116a, 116n), if equipped, or an indirect wireless connection, (e.g., via Bluetooth or other near field communication (e.g., 118a, 118n)), to a user's mobile device (e.g., 114a, 114n) configured to relay information via wireless connections (e.g., 120a, 120n) to the backend server 112 via the Internet 110. For example, mobile device 114a associated with a user may be used to receive vehicle state information from the electric vehicle 102a and relay such information via the Internet 110 to backend server 112. Mobile devices 114a, 114n may have an application associated an on-demand electric vehicle provider installed. In some embodiments, mobile device 114a associated with a user may be used to receive configuration data from the backend server 112 and relay such information via the wireless connection 118a to electric vehicle 102a.

In various embodiments, vehicle state information including at least a battery charge level of an electric vehicle, a location of the electric vehicle, an orientation of the electric vehicle (e.g, upright or fallen), or a position of the electric vehicle may be reported from time to time and/or upon occurrence of certain events to backend server 112. Configuration data may include a maximum speed associated with a location of the electric vehicle.

A computer system may comprise one or more sensors configured to measure orientation, acceleration, tilt, and/or location (e.g., gyroscope, accelerometer, inclinometer, clinometer, GPS, etc.). In an up-right position, an orientation sensor is configured to output a first set of values. In a fallen position, the orientation sensor is configured to output a second set of values. Electric vehicles 102a, 102n may be determined to be in a fallen position based on an output of their corresponding orientation sensors. In other embodiments, electric vehicles 102a, 102n may provide their corresponding orientation data to backend server 112, which may use the corresponding orientation data to determine that an electric vehicle has fallen (e.g., on its side).

In an up-right position, a tilt sensor is configured to output a first set of values. In a fallen position, the tilt sensor is configured to output a second set of values. Electric vehicles 102a, 102n may be determined to be in a fallen position based on an output of their corresponding tilt sensors. In other embodiments, electric vehicles 102a, 102n may provide their corresponding tilt data to backend server 112, which may use the corresponding tilt data to determine that an electric vehicle has fallen (e.g., on its side).

In an up-right position, an acceleration sensor is configured to output a first set of values. Between the up-right position and a fallen position, the acceleration sensor is configured to output a second set of values. In a fallen position, the acceleration sensor is configured to output a third set of values. Electric vehicles 102a, 102 may be determined to be in a fallen position based on an output of their corresponding acceleration sensors. In other embodiments, electric vehicles 102a, 102n may provide their corresponding acceleration data to backend server 112, which may use the corresponding acceleration data to determine that an electric vehicle has fallen (e.g., on its side).

A location sensor may be configured to output location data. The location data may be provided directly from electric vehicles 102a, 102n to backend server 112 via wireless connections 116a, 116n, respectively and the Internet 110. In other embodiments, location data is provided indirectly from electric vehicles 102a, 102n to backend server 112 via mobile devices 114a, 114n, respectively, wireless connections 120a, 120n, respectively, and the Internet 110. In some embodiments, mobile devices 114a, 114n provide their corresponding location data to backend server. Backend server 112 may use either location data from an electric vehicle or an associated mobile device to determine the location of the electric vehicle.

Backend server 112 in various embodiments maintains current and/or historical vehicle state information in a vehicle and user data store 122, e.g., a database. Vehicle information stored in data store 122 may include without limitation a history of preventive maintenance, repairs, ride and/or other usage history and data, user and/or charger feedback about the vehicle and/or its condition, charge state, battery health, current location, orientation (e.g., upright or fallen), etc. User information stored in data store 122 may include without limitation records associated with users registered to ride vehicles comprising the fleet, such as electric vehicles 102a, 102n, users registered to charge vehicles comprising the fleet in exchange for a payment and/or other consideration (e.g., ride credits, virtual currency, status or other recognition within a user community, etc.), users registered to fix fallen electric vehicles (e.g., "fixers") in exchange for a payment and/or other consideration, and users registered to re-locate electric vehicles (e.g., "rebalancers") in exchange for a payment and/or other consideration. User records for users who charge vehicles (sometimes referred to as "chargers") in various embodiments may include information indicating which vehicles are currently being charged (or reserved to be charged) by the user; financial account information; past, current, or expected payment information; charger performance metrics, such as percent on time redeployment, etc.; etc.

User records for users who fix fallen electric vehicles in various embodiments may include information indicating which vehicles are currently reserved to be placed in an up-right positon by the user; financial account information; past, current, or expected payment information; performance metrics (e.g., time from selection of fallen electric vehicle to time of fixing the selected fallen electric vehicle, etc.), etc.

User records for users who re-locate electric vehicles in various embodiments may include information indicating which vehicles are currently reserved to be re-located by the user; financial account information; past, current, or expected payment information; performance metrics (e.g., time from selection of electric vehicle to be relocated to time of actual relocating electric vehicle, etc.), etc.

Backend server 112 may be configured to update the configuration of a rented electric vehicle based a location associated with the rented electric vehicle to restrict operation of the rented electric vehicle in a restricted zone. For example, backend server 112 may determine a location associated with a rented electric vehicle. The determined location may be associated with one or more restricted areas. Backend server 112 may maintain a map that includes one or more restricted areas. In some embodiments, backend server 112 receives location data associated with a rented electric vehicle and compares the received location to boundaries associated with one or more restricted areas. In the event the received location is in or near a restricted area within a threshold distance, backend server 112 may send configuration data to the rented electric vehicle to modify a configuration of the rented electric vehicle (e.g., reduce a maximum speed or prevent operation). In some embodiments, the configuration data is directly provided from backend server 112 to an electric vehicle 102a, 102n via wireless connections 116a, 116n, respectively. In some embodiments, the configuration data is indirectly provided from backend server 112 to an electric vehicle 102a, 102n via wireless connections 120a, 120n, mobile devices 114a, 114n, and wireless connections 118a, 118n, respectively. In some embodiments, backend server 112 determines whether the rented electric vehicle is capable of entering the one or more restricted areas based on a remaining amount of charge associated with the rented electric vehicle and a current location of the rented electric vehicle. For example, an electric vehicle may be capable of traveling 15 miles on a single charge before the electric vehicle needs to be re-charged. Backend server 112 may determine whether the electric vehicle is within 15 miles of any restricted area. In the event the rented electric vehicle is capable of traveling to a restricted area using the remaining amount of charge, backend server may send configuration data to the rented electric vehicle to prevent the rented electric vehicle from operating in a restricted area. In response to receiving the configuration data, the rented electric vehicle is prevented from operating in a restricted area.

Backed server 112 may be configured to update the configuration of a rented electric vehicle to reduce a maximum capable speed of the rented electric vehicle based on a location associated with the rented electric vehicle. For example, backend server 112 may determine a location associated with a rented electric vehicle. The determine location may be associated with one or more areas subject to speed restrictions. Backed server 112 may maintain a map that includes the one or more areas subject to speed restrictions. In some embodiments, backend server 112 receives location data associated with a rented electric vehicle and compares the received location to boundaries associated with one or more areas subject to speed restrictions. In the event the received location is in an area subject to a speed restriction, backend server 112 may send configuration data to the rented electric vehicle to modify a configuration of the rented electric vehicle (e.g., reduce a maximum speed). In some embodiments, the configuration data is directly provided from backend server 112 to an electric vehicle 102a, 102n via wireless connections 116a, 116n, respectively. In some embodiments, the configuration data is indirectly provided from backend server 112 to an electric vehicle 102a, 102n via wireless connections 120a, 120n, mobile devices 114a, 114n, and wireless connections 118a, 118n, respectively. In some embodiments, backend server 112 determines whether the rented electric vehicle is capable of entering the one or more areas with speed restrictions based on a remaining amount of charge associated with the rented electric vehicle and a current location of the rented electric vehicle. For example, an electric vehicle may be capable of traveling 15 miles on a single charge before the electric vehicle needs to be re-charged. Backend server 112 may determine whether the electric vehicle is within 15 miles of any area subject to a speed restriction. In the event the rented electric vehicle is capable of traveling to an area subject to a speed restriction using the remaining amount of charge, backend server may send configuration data to the rented electric vehicle to reduce a maximum speed associated with the rented electric vehicle upon entering an area with a speed restriction. In response to receiving the configuration data, a maximum speed of the rented electric vehicle is reduced upon the rented electric vehicle entering an area with a speed restriction. For example, the electric vehicle may be capable of reaching a maximum speed of 15 mph in a non-restricted area and capable of reaching a maximum speed of 7 mph in an area with a speed restriction.

Backend server 112 may be configured to cause a fixer to fix one or more fallen electric vehicles. After a user has finished a rental of the electric vehicle, the electric vehicle may be placed in an upright position. The electric vehicle may be tipped over (either accidentally or on-purpose). The electric vehicle may remain in a fallen position until someone fixes the position of the fallen electric vehicle (i.e., place the fallen electric vehicle in an upright position). Fallen electric vehicles may be viewed as a nuisance because they may be blocking sidewalks, pathways, or doorways.

Backed server 112 may receive an indication that an electric vehicle is no longer in an upright position. For example, backend server 112 may receive orientation data or acceleration data that indicates that electric vehicle is no longer in an upright position. In some embodiments, an electric vehicle provides a notification to backend server 112 that indicates the electric vehicle is in a fallen position.

Backed server 112 may update a user interface of an application associated with the on-demand electric vehicle provider that indicates corresponding locations for one or more fallen electric vehicles. A fixer via the fixer's mobile device may view corresponding locations associated with one or more fallen electric vehicles. Each fallen electric vehicle may have a corresponding incentive. Examples of incentives include money, credits to use electric vehicles associated with the electric vehicle provider, credits to use at a goods provider (e.g., retail provider, food provider, etc.), credits to use at a service provider (e.g., free car wash, free house cleaning, etc.), etc.

Backend server 112 may receive a selection of one or more fallen electric vehicles. In response to the selection, backend server 112 may update the user interface of the application associated with the on-demand electric vehicle provider such that the one or more selected fallen electric vehicles are no longer available for one or more other fixers to select. Backend server 112 may receive an indication that a fallen on-demand electric vehicle is in an up-right position. For example, backend server 112 may receive a picture of the fallen on-demand electric vehicle from a mobile device associated with the fixer.

Backend sever 112 may receive from the fallen on-demand vehicle orientation data that indicates the fallen electric vehicle is in an up-right position. Backend sever 112 may receive from the fallen vehicle acceleration data that indicates the fallen electric vehicle is in an up-right position. In response to the electric vehicle being in an up-right position, backend server 112 may provide the incentive associated with the fallen electric vehicle to the fixer.

Backend server 112 may be configured to cause a rebalancer to change a location of one or more electric vehicles. On-demand electric vehicles may not be tied to a particular docking station. This may allow a user to leave an electric vehicle in at any location. In some embodiments, the location is a low-demand zone (e.g., a zone having a frequency of users below a first demand threshold). This may lead to an inefficient use of the on-demand electric vehicle because the electric vehicle may remain un-used until it is picked up and relocated to another location. In some embodiments, the location is oversaturated with other on-demand electric vehicles (e.g., a location having a number of on-demand electric vehicles greater than a saturation threshold.). This may also lead to an inefficient use of the on-demand electric vehicle because the on-demand electric vehicle may remain un-used since there may be insufficient demand for the plurality of on-demand electric vehicles at the location. In some embodiments, the location is a location prone to theft and/or vandalism. This may also lead to an inefficient use of the on-demand electric vehicle since a theft of the on-demand electric vehicle prevents any potential users from renting the on-demand electric vehicle. Vandalism may cause damage to the on-demand electric vehicle, which renders the on-demand electric vehicle unavailable for use until the damage is repaired. The on-demand electric vehicle may be relocated to a different location to prevent the inefficient use of the on-demand electric vehicle.

Each electric vehicle of the electric vehicle fleet associated with an electric vehicle provider is configured to provide corresponding location data to backend server 112. Backend server 112 may use the location data to partition a map into a plurality of zones. The plurality of zones may comprise one or more low-demand zones, one or more medium-demand zones, and one or more high-demand zones. A low-demand zone may be comprised of an area having a frequency of users below a first demand threshold. A medium-demand zone may be comprised of an area having a frequency of users greater than or equal to the first demand threshold and less than a second demand threshold. A high-demand zone may be comprised of an area having a frequency of users greater than or equal to the second demand threshold.

The plurality of zones may comprise one or more low-saturation zones, one or more medium-saturation zones, and one or more high-saturation zones. A low-saturation zone may be comprised of an area having a number of electric vehicles available for rental below a first saturation threshold. A medium-saturation zone may be comprised of an area having a number of electric vehicles available for rental greater than or equal to the first saturation threshold and less than a second saturation threshold. A high-saturation zone may be comprised of an area having a number of electric vehicles available for rental greater than or equal to the second saturation threshold.

The plurality of zones may comprise one or more low theft/vandalism zones, one or more medium theft/vandalism zones, and one or more high theft/vandalism zones. A low-theft/vandalism zone may be comprised of an area having a number of theft/vandalism incidents below a first theft/vandalism threshold. A medium-theft/vandalism zone may be comprised of an area having a number of theft/vandalism incidents greater than or equal to the first theft/vandalism threshold and less than a second theft/vandalism threshold. A high-theft/vandalism zone may be comprised of an area having a number of theft/vandalism incidents greater than or equal to the second theft/vandalism threshold.

The plurality of demand zones, saturation zones, and theft/vandalism zones may overlap. An on-demand electric vehicle may be located in a high-demand zone, but the high-demand zone is also a high-saturation zone. In the event an electric vehicle available for rental is located in any inefficient use zone (e.g., low-demand zone, a high-saturation zone, or a high-theft/vandalism zone), backend server 112 may update a user interface of an application associated with an on-demand electric vehicle provider that indicates a location of one or more electric vehicles located in an inefficient use zone. A rebalancer via the rebalancer's mobile device may view via the applications user interface corresponding locations associated with one or more electric vehicles located in one or more inefficient use zones. Each electric vehicle located in an inefficient use zone may have a corresponding incentive. Examples of incentives include money, credits to use electric vehicles associated with the electric vehicle provider, credits to use at a goods provider (e.g., retail provider, food provider, etc.), credits to use at a service provider (e.g., free car wash, free house cleaning, etc.), etc.

Backend server 112 may receive a selection of one or more electric vehicles located in a corresponding inefficient use zone. In response to the selection, backend server 112 may update the user interface such that the one or more selected electric vehicles are no longer available for one or more other rebalancers to select. Backend server 112 may receive an indication that a selected on-demand electric vehicle has been relocated from an inefficient use zone to an efficient use zone (e.g., medium-demand zone, high-demand zone, low-saturation zone, medium-saturation zone, low-theft/vandalism zone, medium-theft/vandalism zone). For example, backend server 112 may receive a picture of the relocated on-demand electric vehicle from a mobile device associated with the rebalancer. The picture may include metadata that indicates a location at which the picture was taken. Backend server may determine that the on-demand electric vehicle has been relocated to the efficient use zone based on the metadata. Backend sever 112 may receive from the relocated on-demand vehicle location data that indicates the on-demand electric vehicle has been relocated to an efficient use zone. In response to the on-demand electric vehicle being re-located to an efficient use zone, backend server 112 may provide the incentive associated with the re-located electric vehicle to the rebalancer.

Figure 2:
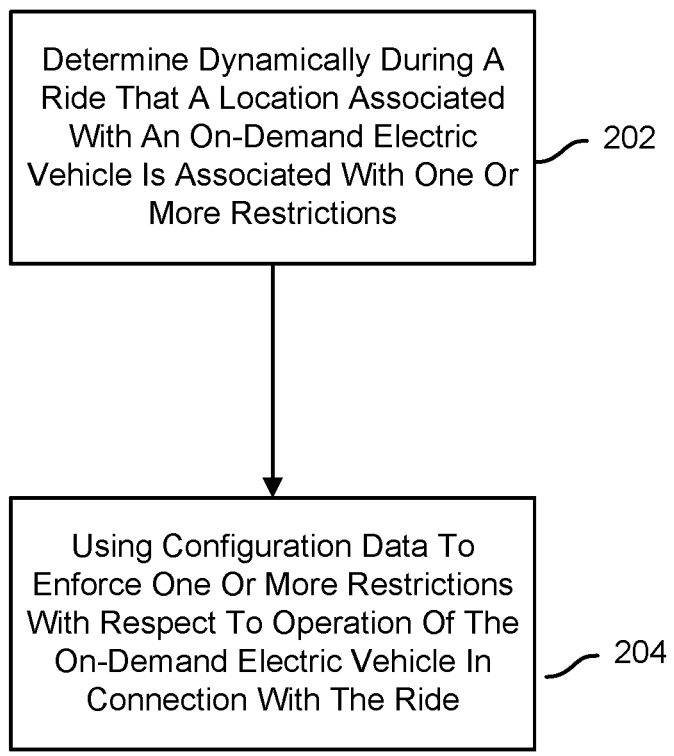
FIG. 2 is a flow chart illustrating an embodiment of a process to configure an on-demand electric vehicle.

FIG. 2 is a flow chart illustrating an embodiment of a process to configure an on-demand electric vehicle. In the example shown, process 200 may be implemented by a backend server, such as backend server 112, or an electric vehicle, such as electric vehicles 102a, 102n.

At 202, a location associated with an on-demand electric vehicle is dynamically determined during a ride to be associated with one or more restrictions.

The on-demand electric vehicle may be equipped with a location sensor (e.g., GPS). The location sensor may output location data associated with the on-demand electric vehicle during a ride of the on-demand electric vehicle. A processor of the on-demand electric vehicle may determine the location of the on-demand electric vehicle based on the location data. The location may be determined a plurality of times during the ride of the on-demand electric vehicle.

Location data associated with the on-demand electric vehicle may be provided to a backend server during a ride of the on-demand electric vehicle. In some embodiments, the location data associated with the on-demand electric vehicle is directly provided to the backend server via a wireless connection of the on-demand electric vehicle. In some embodiments, the location data associated with the on-demand electric vehicle is indirectly provided to the backend server via a wireless connection of a mobile device that is coupled to the on-demand electric vehicle.

The backend server may receive the location data associated with the on-demand electric vehicle and determine the location of the on-demand electric vehicle based on the received location data. The backend server may receive a plurality of location data and determine a plurality of times during the ride a location of the on-demand electric vehicle.

At 204, configuration data is used to enforce the one or more restrictions with respect to operation of the on-demand electric vehicle in connection with the ride.

A location of an on-demand electric vehicle may be associated with one or more restrictions. For example, the on-demand electric vehicle may be near or in a restricted area. The on-demand electric vehicle may be in an area subject to one or more speed restrictions. The on-demand electric vehicle may be in an area subject to one or more weather restrictions. The on-demand electric vehicle may be in an area subject to one or more time-based restrictions.

In the event it is determined that the on-demand electric vehicle's location is associated with one or more restrictions, configuration data may be used to enforce the one or more restrictions with respect to operation of the on-demand electric vehicle in connection with the ride. The backend server may provide configuration data to the on-demand electric vehicle to enforce the one or more restrictions with respect to operation of the on-demand electric vehicle in connection with the ride. In response to receiving the configuration data, the on-demand electric vehicle may apply the one or more restrictions with respect to operation of the on-demand electric vehicle in connection with the ride. For example, the configuration data may indicate a maximum speed associated with the on-demand electric vehicle for a particular location or an area near the particular location.

In some embodiments, the configuration data is provided at the start of the ride based on an initial location of the on-demand electric vehicle. In some embodiments, the configuration data is provided during the ride based on a current location of the on-demand electric vehicle. The on-demand electric vehicle may apply the configuration data upon receiving the configuration data.

Figure 3A:
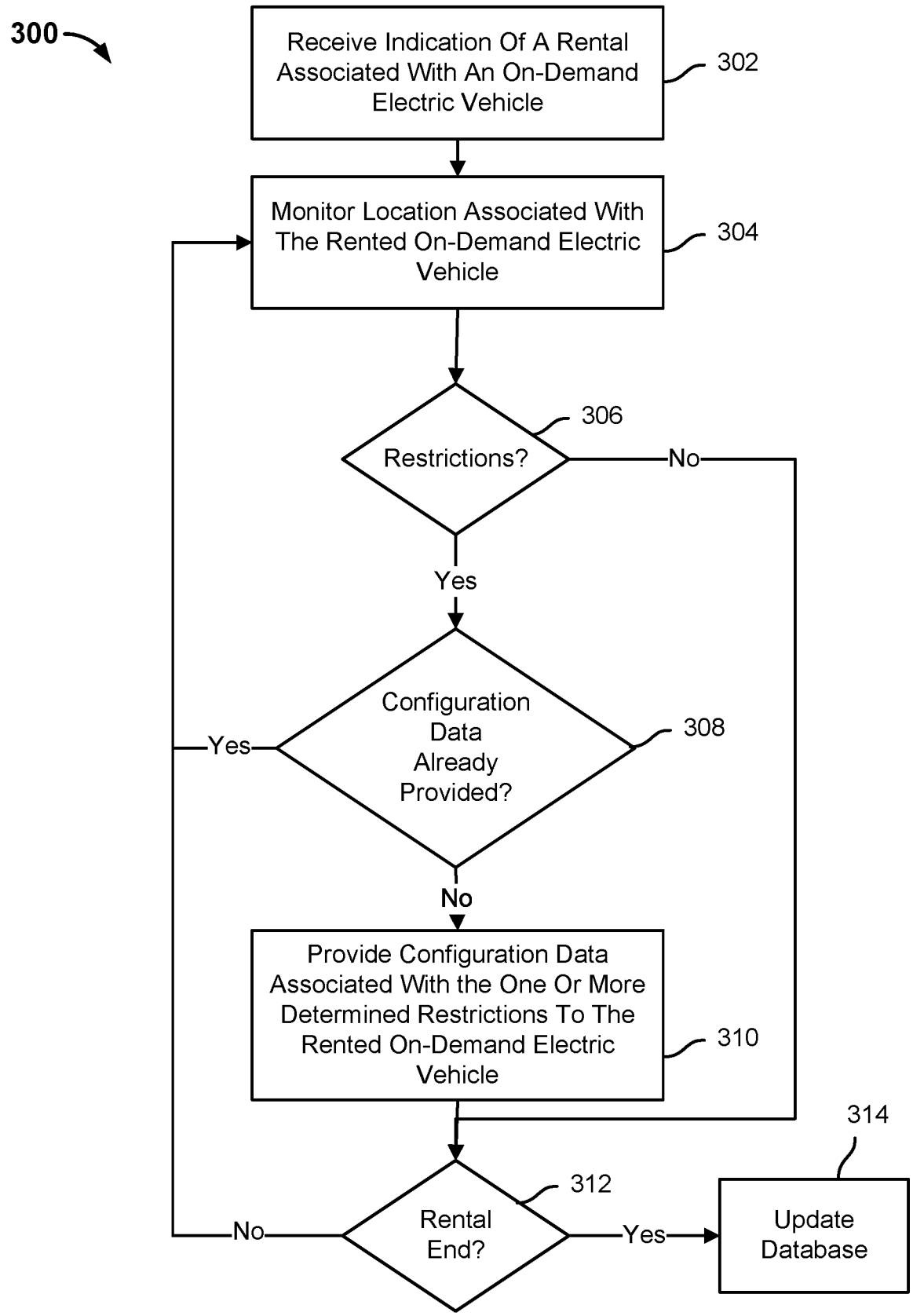
FIG. 3A is a flow chart illustrating an embodiment of a process to configure an on-demand electric vehicle.

FIG. 3A is a flow chart illustrating an embodiment of a process to configure an on-demand electric vehicle. In the example shown, process 300 may be implemented by a backend server, such as backend server 112.

At 302, an indication of a rental associated with an on-demand electric vehicle is received. A user may rent an on-demand electric vehicle using an app associated with the on-demand electric vehicle provider that is installed on the user's mobile device. In some embodiments, the user may use the app to scan a QR code associated with the on-demand electric vehicle to activate a rental. In other embodiments, the user may use the app to enter a code associated with the on-demand electric vehicle (e.g., a code marked on the on-demand electric vehicle) to activate a rental. Upon scanning the QR code associated with the on-demand electric vehicle or entering a correct code associated with the on-demand electric vehicle, the mobile device associated with the user may send to a backend server the indication of a rental associated with the on-demand electric vehicle.

At 304, a location associated with the rented on-demand electric vehicle is monitored. The location associated with the rented on-demand electric vehicle may be monitored in real-time. Location data may be received from the rented on-demand electric vehicle, a mobile device associated with a user of the rented on-demand electric vehicle, or both. Location data may be received on a periodic basis during a rental period of the on-demand electric vehicle (e.g., every half second, every second, every five seconds, etc.). The mobile device associated with the user of the rented on-demand electric vehicle may include an application associated with the on-demand electric vehicle. The application associated with the on-demand electric vehicle may cause the mobile device location data associated with mobile device to be provided during a rental period of the rented on-demand electric vehicle.

At 306, it is determined whether the monitored location is associated with one or more restrictions. The location data from the rented on-demand electric vehicle, a mobile device associated with a user of the rented on-demand electric vehicle, or both, may be used to determine a current location of the rented on-demand electric vehicle.

In some embodiments, the monitored location is associated with a restricted area. A restricted area may correspond to an area, (e.g., entire city, a college campus, an area affected by inclement weather, an area associated with a special event, sidewalks, etc.) where operation of an electric vehicle is not permitted. For example, a city, such as Beverly Hills, may restrict the use of electric vehicles within its city limits. A college or university, such as San Jose State University, may restrict the use of an electric vehicle on its campus. A city, such as New Orleans, may become flooded after a storm. An electric vehicle may be unable to properly operate in a flooded area (e.g., a road is submerged). A special event may be going on when the electric vehicle is rented. Areas associated with the special event may prohibit the use of an electric vehicle. These areas may correspond to areas where an electric vehicle is allowed, but for the special event. Some areas may become restricted areas during certain times of the day (e.g., between 12 pm-4 pm, after 6 pm, between dusk and dawn, etc.).

A backend server may maintain a map that includes one or more restricted areas. The map may include boundary information associated with the one or more restricted areas (e.g., a geo-fence). For example, the boundary information may include coordinates associated with the perimeter of a restricted area. A backend server may determine whether the location data associated with the rented on-demand electric vehicle is near a restricted area within a threshold distance or in a restricted area by comparing the received location data to the boundary information associated with the one or more restricted areas.

A monitored location is associated with a restricted area in the event the location data associated with the rented on-demand electric vehicle is near a restricted area within a threshold distance or in a restricted area by comparing the received location data to the boundary information associated with the one or more restricted areas. A monitored location is not associated with a restricted area in the event the location data associated with the rented on-demand electric vehicle is not near a restricted area within a threshold distance or not in a restricted area by comparing the received location data to the boundary information associated with the one or more restricted areas.

In some embodiments, the monitored location is associated with an area subject to a speed restriction. A user may ride the electric vehicle at an inappropriate speed for a particular context (e.g., time of day, location, weather, traffic conditions, special events, etc.). The monitored location may be used to determine if a speed restriction should be applied to the rented on-demand electric vehicle. An area may permit the operation of on-demand electric vehicles, but at speeds lower than a capability of the electric vehicle. For example, the default maximum speed of an electric vehicle may be 15 mph. An area may permit the operation of electric vehicles, but at a maximum speed of 7 mph.

In some embodiments, an area is subject to a speed restriction during a particular time of day (e.g., (e.g., between 12 pm-4 pm, after 6 pm). In some embodiments, an area is subject to a speed restriction from local, state, or federal regulations. For example, a local city ordinance may stipulate that the maximum speed for an on-demand electric vehicle on a beach bike path is 8 mph. In some embodiments, an area is subject to a speed restriction based on weather conditions. For example, the maximum speed for an on-demand electric vehicle in a particular area while it is raining may be 5 mph. In some embodiments, an area is subject to a speed restriction based on current traffic conditions. For example, an area (e.g., main road) may have a certain amount of cars on it during a particular time of day (rush hour). The maximum speed for an electric vehicle may be reduced during the particular time of day based on traffic conditions. This may prevent a number of accidents associated with users of electric vehicles since the electric vehicles will be traveling at lower speeds. In some embodiments, an area is subject to a speed restriction during a special event. For example, an area may host a street festival. During the hours of the street festival, the maximum speed for an electric vehicle may be reduced in the area of the street festival.

A backend server may maintain a map that includes one or more areas subject to one or more speed restrictions. The map may include boundary information associated with the one or more areas subject to one or more speed restrictions. For example, the boundary information may include coordinates associated with the perimeter of an area subject to one or more speed restrictions. A backend server may determine whether the location data associated with the rented on-demand electric vehicle is in an area subject to one or more speed restrictions.

In the event the monitored location is not associated with one or more restrictions (e.g., not near or within a restricted area or not within an area subject to one or more speed restrictions), process 300 proceeds to 312. In the event the monitored location is associated with one or more restrictions (e.g., near or within a restricted area or within an area subject to a speed restrictions), process 300 proceeds to 308.

At 308, it is determined whether configuration data associated with the one or more determined restrictions has been already provided. In the event the configuration data associated with the one or more determined restrictions has been already provided, process 300 returns to 304. In the event the configuration data associated with the one or more determined restrictions has not been already provided, process 300 proceeds to 310.

At 310, configuration data associated with the one or more determined restrictions is provided to the rented on-demand electric vehicle. In some embodiments, step 310 is implemented to perform some or all of step 204 of process 200.

The configuration data associated with the one or more restrictions may reduce a maximum speed associated with the rented on-demand electric vehicle. In some embodiments, the maximum speed associated with the rented on-demand electric vehicle is reduced from the default maximum speed associated with the rented on-demand electric vehicle to a speed greater than 0 mph. In some embodiments, the maximum speed associated with the rented on-demand electric vehicle is reduced from a reduced maximum speed associated with the rented on-demand electric vehicle to 0 mph. In some embodiments, the maximum speed associated with the rented on-demand electric vehicle is reduced from the default maximum speed associated with the rented on-demand electric vehicle to 0 mph.

At 312, it is determined if a rental of the rented on-demand electric vehicle has ended. A user associated with the rented on-demand electric vehicle may use the application associated with the on-demand electric vehicle provider to indicate that a rental of the rented on-demand electric vehicle has ended. In response to the indication, the application associated with the on-demand electric vehicle provider may cause the mobile device on which the application is installed to provide a notification that the rental has ended to the backend server. In some embodiments, the on-demand electric vehicle includes an interface that allows a user of the on-demand electric vehicle to indicate that the rental has ended. In response to receiving an interaction that indicates the rental has ended, the on-demand electric vehicle may be configured to provide a notification that the rental has ended to the backend server.

In the event it is determined that the rental of the rented on-demand electric vehicle has ended, process 300 proceeds to 314. In the event it is determined that the rental of the rented on-demand electric vehicle has not ended, process 300 returns to 304.

At 314, a database is updated. The database may be updated to indicate the rented on-demand electric vehicle is now available for rental. The database may be updated to indicate the rented on-demand electric vehicle is now available for charging. The database may be updated to indicate the rented on-demand electric vehicle is now available for rebalancing. The database may indicate that the rented on-demand electric vehicle is in an up-right position.

The backend server may provide a user interface in the application associated with the on-demand electric vehicle provider. The user interface may be updated based on the updated database information. For example, a potential rider may see via the application user interface that the rented on-demand electric vehicle is now available for rental. A potential charger may see via the application user interface that the rented on-demand electric vehicle is now available for charging. A potential rebalancer may see via the application user interface that the rented on-demand electric vehicle is now available for re-location.

Figure 3B:
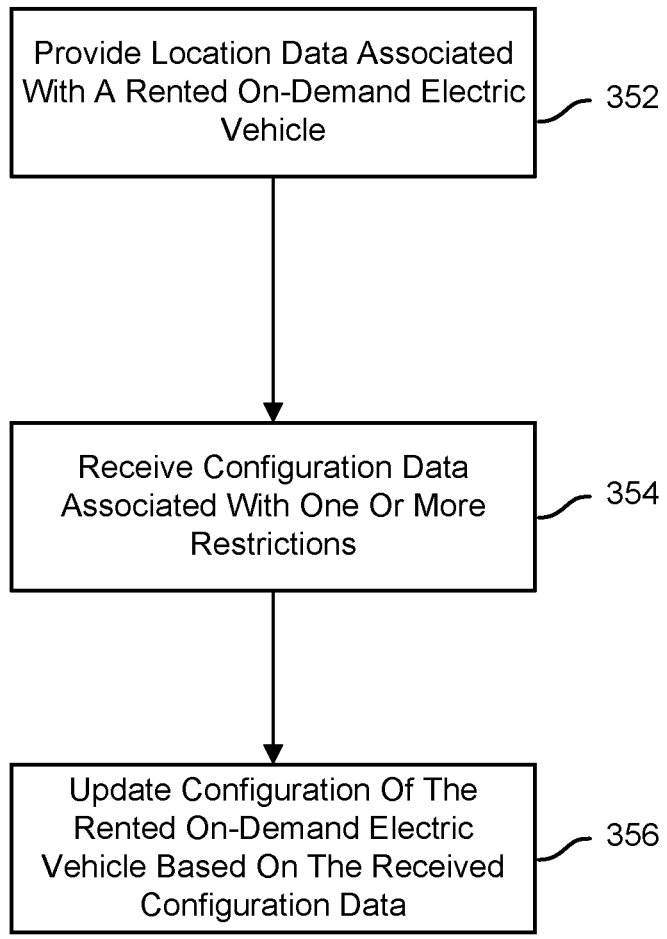
FIG. 3B is a flow chart illustrating an embodiment of a process to configure an on-demand electric vehicle.

FIG. 3B is a flow chart illustrating an embodiment of a process to configure an on-demand electric vehicle. In the example shown, process 350 may be implemented by an electric vehicle, such as electric vehicles 112a, 112n. The maximum speed of the on-demand electric vehicle may dynamically change based on a geo-location of the on-demand electric vehicle.

At 352, location data associated with a rented on-demand electric vehicle is provided. The location data may be provided to a backend server, such as backend server 112. The location data may be provided from the rented on-demand electric vehicle, a mobile device associated with a user of the rented on-demand electric vehicle, or both. Location data may be provided on a periodic basis during a rental period of the on-demand electric vehicle (e.g., every half second, every second, every five seconds, etc.). The mobile device associated with the user of the rented on-demand electric vehicle may include an application associated with the on-demand electric vehicle. The application associated with the on-demand electric vehicle may cause location data associated with mobile device to be provided during a rental period of the rented on-demand electric vehicle.

At 354, configuration data associated with one or more restrictions is received. The one or more restrictions may be associated with a restricted area. The one or more restrictions may be associated with an area subject to a speed restriction. A backend server that received the provided location data may determine that the rented on-demand electric vehicle is near or in a restricted area. The backend server may provide configuration data associated with a restricted area. The configuration data may include a maximum speed configuration data for the rented on-demand electric vehicle when the rented on-demand electric vehicle is near the restricted area within a threshold distance. The configuration data may include a maximum speed configuration data (e.g., 0 mph) for the rented on-demand electric vehicle when the rented on-demand electric vehicle is in the restricted area.

A backend server that received the provided location data may determine that the rented on-demand electric vehicle in an area subject to a speed restriction. The backend server may provide configuration data associated with the area subject to a speed restriction. The configuration data may include a maximum speed configuration data for the rented on-demand electric vehicle for the provided location.

At 356, a configuration of the rented on-demand electric vehicle is updated based on the received configuration data. In some embodiments, step 356 is implemented to perform some or all of step 204 of process 200.

In the event the provided location data indicates that the rented on-demand electric vehicle is near a restricted area within a threshold distance, the received configuration data may reduce the maximum speed associated with the rented on-demand electric vehicle. A processor of the rented on-demand electric vehicle may reduce the maximum speed associated with the on-demand electric vehicle by reducing the maximum amount of voltage, current, or power given to an electric motor of the on-demand electric vehicle.

In the event the provided location data indicates that the rented on-demand electric vehicle is in a restricted area, the received configuration data may reduce the maximum speed associated with the rented on-demand electric vehicle. For example, the maximum speed of the on-demand electric vehicle may be reduced to 0 mph, which causes the user of the on-demand electric vehicle to get off the on-demand electric vehicle and walk the on-demand electric vehicle out of the restricted area. The processor of the on-demand electric vehicle may prevent the power source of the on-demand electric vehicle from providing voltage, current, or power given to the electric motor of the on-demand electric vehicle.

In the event the provided location data indicates that the rented on-demand electric vehicle is in an area subject to a speed restriction, the received configuration data may reduce the maximum speed associated with the rented on-demand electric vehicle. A processor of the rented on-demand electric vehicle may reduce the maximum speed associated with the on-demand electric vehicle by reducing the maximum amount of voltage, current, or power given to an electric motor of the on-demand electric vehicle.

Figure 4A:
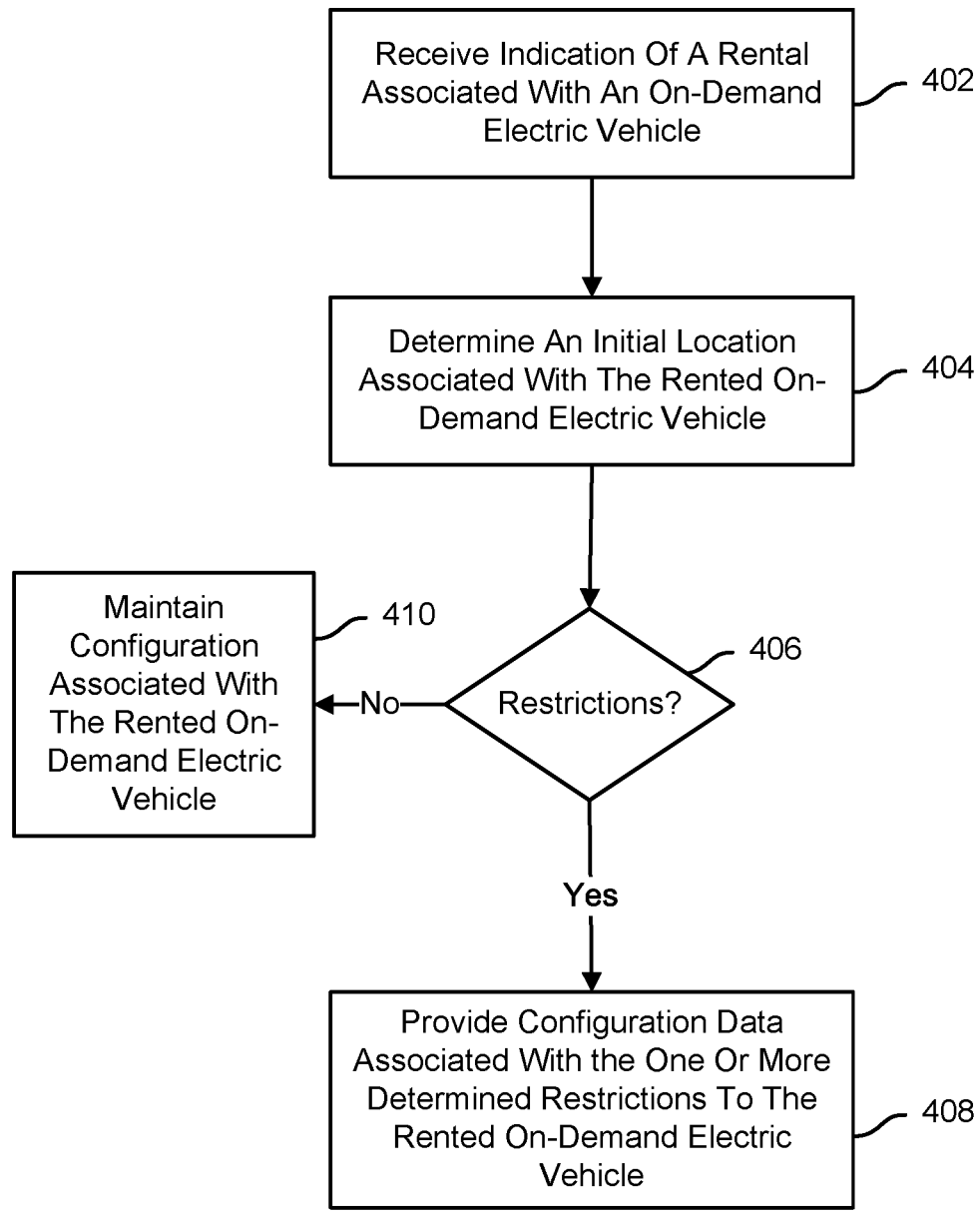
FIG. 4A is a flow chart illustrating an embodiment of a process to configure an on-demand electric vehicle.

FIG. 4A is a flow chart illustrating an embodiment of a process to configure an on-demand electric vehicle. In the example shown, process 400 may be implemented by a backed server, such as backend server 112.

At 402, an indication of a rental associated with an on-demand electric vehicle is received. A user may rent an on-demand electric vehicle using an app associated with the on-demand electric vehicle provider that is installed on the user's mobile device. In some embodiments, the user may use the app to scan a QR code associated with the on-demand electric vehicle to activate a rental. In other embodiments, the user may use the app to enter a code associated with the on-demand electric vehicle (e.g., a code marked on the on-demand electric vehicle) to activate a rental. Upon scanning the QR code associated with the on-demand electric vehicle or entering a correct code associated with the on-demand electric vehicle, the mobile device associated with the user may send to a backend server the indication of a rental associated with the on-demand electric vehicle.

At 404, an initial location associated with the rented on-demand electric vehicle is determined. The on-demand electric vehicle may include a GPS device that provides location data. In some embodiments, location data associated with the rented on-demand electric vehicle is directly received from the on-demand electric vehicle. In some embodiments, location data associated with the rented on-demand electric vehicle is indirectly received from the on-demand electric vehicle via the user's mobile device. For example, location data associated with the rented on-demand electric vehicle is received from the user's mobile device. The mobile device associated with the user of the rented on-demand electric vehicle may include an application associated with the on-demand electric vehicle. The application associated with the on-demand electric vehicle may cause location data associated with mobile device to be provided during a rental period of the rented on-demand electric vehicle.

Upon receiving the location data, the backend server may determine the location associated with the rented on-demand electric vehicle. The location data from the rented on-demand electric vehicle, a mobile device associated with a user of the rented on-demand electric vehicle, or both, may be used to determine the location of the rented on-demand electric vehicle.

At 406, it is determined whether the rented on-demand electric vehicle is associated with one or more restrictions based on the location associated with the rented on-demand electric vehicle.

An on-demand electric vehicle includes one or more batteries that power the electric vehicle. A user may rent an on-demand electric vehicle and use the on-demand electric vehicle until the on-demand electric vehicle runs out of power. The on-demand electric vehicle has a particular amount of power remaining at the time of rental. The particular amount of power remaining corresponds to a particular distance. For example, an on-demand electric vehicle with a battery at 100% charge may travel a distance of approximately 15 miles without recharging. An on-demand electric vehicle with a battery at 50% charge may travel a distance of approximately 7 miles without recharging. An on-demand electric vehicle with a battery at 25% charge may travel a distance of approximately 3 miles without recharging. A rented on-demand electric vehicle is associated with a travel radius. The travel radius corresponds to a potential distance that the on-demand electric vehicle may travel if the on-demand electric vehicle were to travel in a straight line until the one or more batteries of the on-demand electric vehicle are no longer able to power the on-demand electric vehicle.

A potential circle of travel may be generated to determine the potential areas to which the rented on-demand electric vehicle may travel. The potential circle of travel is specific to each on-demand electric vehicle and is based on the initial location of the rented on-demand electric vehicle and the amount of charge remaining associated with the rented on-demand electric vehicle. In some embodiments, the potential circle of travel is an imperfect circle when considering other factors that affect the potential range of an on-demand electric vehicle, such as elevation gain/loss, road conditions, etc.

The potential areas may be associated with one or more restrictions. In some embodiments, the potential areas include one or more restricted areas. A restricted area may correspond to an entire city, a college campus, an area affected by inclement weather, an area associated with a special event. For example, a city, such as Beverly Hills, may restrict the use of on-demand electric vehicles within its city limits. A college or university, such as San Jose State University, may restrict the use of an on-demand electric vehicle on its campus. A city, such as New Orleans, may become flooded after a storm. An electric vehicle may be unable to properly operate in a flooded area (e.g., a road is submerged). A special event may be going on when the on-demand electric vehicle is rented. Areas associated with the special event may prohibit the use of an on-demand electric vehicle. These areas may correspond to areas where an on-demand electric vehicle is allowed, but for the special event.

In some embodiments, the potential areas are associated with one or more areas subject to speed restrictions. A user may ride the electric vehicle at an inappropriate speed for a particular context (e.g., time of day, location, weather, traffic conditions, special events, etc.). The monitored location may be used to determine if a speed restriction should be applied to the rented on-demand electric vehicle. An area may permit the operation of on-demand electric vehicles, but at speeds lower than a capability of the on-demand electric vehicle. For example, the default maximum speed of an on-demand electric vehicle may be 15 mph. An area may permit the operation of on-demand electric vehicles, but at a maximum speed of 7 mph.

In some embodiments, an area is subject to a speed restriction during a particular time of day (e.g., (e.g., between 12 pm-4 pm, after 6 pm). In some embodiments, an area is subject to a speed restriction from local, state, or federal regulations. For example, a local city ordinance may stipulate that the maximum speed for an on-demand electric vehicle on a beach bike path is 8 mph. In some embodiments, an area is subject to a speed restriction based on weather conditions. For example, the maximum speed for an on-demand electric vehicle in a particular area while it is raining may be 5 mph. In some embodiments, an area is subject to a speed restriction based on current traffic conditions. For example, an area (e.g., main road) may have a certain amount of cars on it during a particular time of day (rush hour). The maximum speed for an on-demand electric vehicle may be reduced during the particular time of day based on traffic conditions. This may prevent a number of accidents associated with users of on-demand electric vehicles since the on-demand electric vehicles will be traveling at lower speeds. In some embodiments, an area is subject to a speed restriction during a special event. For example, an area may host a street festival. During the hours of the street festival, the maximum speed for an on-demand electric vehicle may be reduced in the area of the street festival.

A backend server may maintain a map that includes one or more areas subject to one or more speed restrictions. The map may include boundary information associated with the one or more areas subject to one or more speed restrictions. For example, the boundary information may include coordinates associated with the perimeter of an area subject to one or more speed restrictions. A backend server may determine whether the location data associated with the rented on-demand electric vehicle is in an area subject to one or more speed restrictions.

In the event the rented on-demand electric vehicle is associated with one or more determined restrictions, process 400 proceeds to 408. A rented on-demand electric vehicle is associated with one or more determined restrictions in the event at least a portion of a restricted area or a portion of an area subject to a speed restriction is included in the potential circle of travel associated with the rented on-demand electric vehicle.

In the event the rented on-demand electric vehicle is not associated with one or more restricted areas, process 400 proceeds to 410. A rented on-demand electric vehicle is not associated with one or more determined restrictions in the event at least a portion of a restricted area or a portion of an area subject to a speed restriction is not included in the potential circle of travel associated with the rented on-demand electric vehicle.

At 408, configuration data associated with the one or more determined restrictions is provided to the rented on-demand electric vehicle. In some embodiments, step 408 is implemented to perform some or all of step 204 of process 200. The configuration data associated with the one or more restrictions may reduce a maximum speed associated with the rented on-demand electric vehicle. In some embodiments, the maximum speed associated with the rented on-demand electric vehicle is reduced from the default maximum speed associated with the rented on-demand electric vehicle to a speed greater than 0 mph. In some embodiments, the maximum speed associated with the rented on-demand electric vehicle is reduced from a reduced maximum speed associated with the rented on-demand electric vehicle to 0 mph. In some embodiments, the maximum speed associated with the rented on-demand electric vehicle is reduced from the default maximum speed associated with the rented on-demand electric vehicle to 0 mph.

The configuration data associated with the one or more determined restrictions areas may include boundary information that indicates the boundaries associated with the one or more determined restricted areas. The power source (e.g., one or more batteries) of the rented on-demand electric vehicle may be prevented from providing power to the electric motor of the rented on-demand electric vehicle while the rented on-demand electric vehicle is located in a restricted area.

The configuration data associated with the one or more determined restricted areas may include corresponding threshold distance information with the one or more determined restricted areas. Threshold distance information may indicate a distance from a boundary associated with a restricted area at which a maximum speed of a rented on-demand electric vehicle is reduced. The maximum speed of the rented on-demand electric vehicle may decrease as the rented on-demand electric vehicle gets closer to the boundary associated with the restricted area. For example, the maximum speed of the rented on-demand electric vehicle may be 15 mph. The maximum speed may be reduced from 15 mph to 8 mph when the rented on-demand electric vehicle is within the threshold distance (e.g., 50 feet) of a restricted area. The maximum speed may be further reduced from 8 mph to 3 mph as the rented on-demand electric vehicle gets closer to the boundary of the restricted area (e.g., 10 feet). This may prevent a user of the rented on-demand electric vehicle from falling off the electric vehicle when the electric vehicle enters the restricted area.

The configuration data associated with the one or more determined restricted areas may include time information that indicates when restrictions associated with the one or more determined restricted areas are no longer applicable. For example, a street festival may be going on when an on-demand electric vehicle is rented. The on-demand electric vehicle may have enough charge to reach the area associated with the street festival. However, the street festival may end during a rental period associated with the rented on-demand electric vehicle. In the event the rented on-demand electric vehicle enters the area associated with the street festival after the street festival ends, the restrictions of the area associated with the street festival may not apply anymore, and the rented on-demand electric vehicle should be able to enter the area associated with the street festival.

The configuration data associated with the one or more determined restrictions areas may include boundary information that indicates the boundaries associated with the one or more determined areas subject to speed restrictions. The amount of power provided by the power source (e.g., one or more batteries) of the rented on-demand electric vehicle may be reduced while the rented on-demand electric vehicle is located in an area subject to a speed restriction.

At 410, a configuration associated with the rented on-demand electric vehicle is maintained. By default, a rented on-demand electric vehicle may not be associated with any restricted areas. A user associated with the rented on-demand electric vehicle may be able to ride the rented on-demand electric vehicle to any location without any speed restrictions, provided the rented on-demand electric vehicle still has enough charge to power the rented on-demand electric vehicle.

Figure 4B:
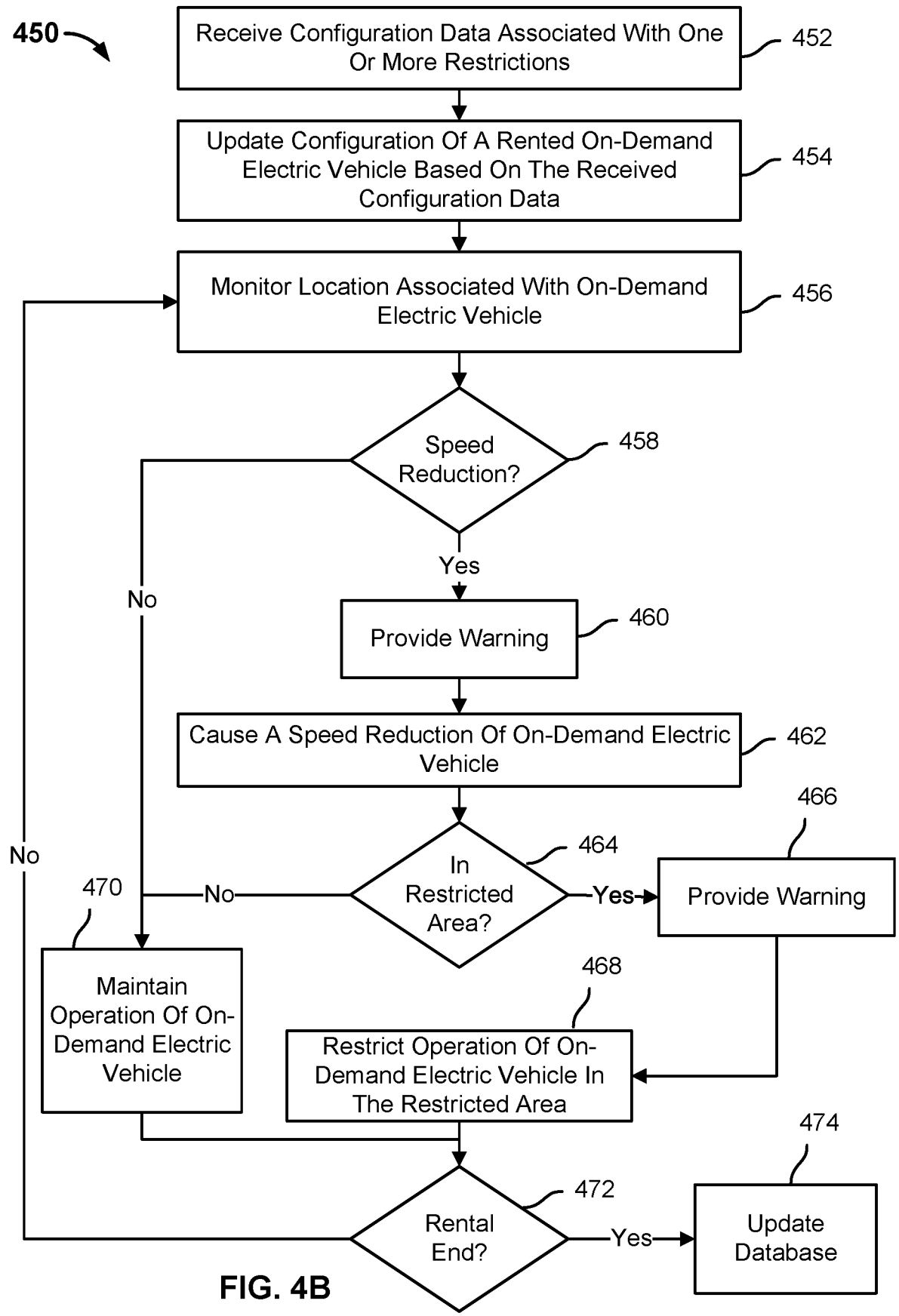
FIG. 4B is a flow chart illustrating an embodiment of a process to configure an on-demand electric vehicle.

FIG. 4B is a flow chart illustrating an embodiment of a process to configure an on-demand electric vehicle. In the example shown, process 450 may be implemented by an on-demand electric vehicle, such as electric vehicles 102*a*, 102*n*. In some embodiments, process 450 is implemented to perform some or all of step 204 of process 200.

At 452, configuration data associated with one or more restrictions is received. As discussed above, a rented on-demand electric vehicle may be associated with one or more restricted areas based on a charge associated with the rented on-demand electric vehicle. The configuration data associated with the one or more determined restricted areas may include corresponding threshold distance information with the one or more determined restricted areas. In some embodiments, the configuration data associated with the one or more determined restricted areas may include corresponding threshold distance information with the one or more determined restricted areas. The configuration data associated with the one or more determined restricted areas may include time information that indicates when restrictions associated with the one or more determined restricted areas are no longer applicable.

At 454, a configuration of a rented on-demand electric vehicle is updated based on the received configuration data.

The on-demand electric vehicle may include a computer system, such as computer system 108. The computer system may include a memory and/or storage device that is configured to store configuration data associated with the on-demand electric vehicle. The on-demand electric vehicle may include a location device, such as a GPS. The data associated with the location device may be used by a processor of the on-demand electric vehicle to determine a location of the on-demand electric vehicle. The stored configuration data may be used by the on-demand electric vehicle's processor to determine how to control the on-demand electric vehicle.

At 456, a location associated with the on-demand electric vehicle is monitored. The received configuration data may include data associated with one or more restricted areas or one or more areas subject to one or more speed restrictions. For example, the data associated with one or more restricted areas may include coordinates associated with the restricted area. During a rental period of an on-demand electric vehicle, the processor may compare the coordinates associated with the restricted area to the location data provided by the location device to determine whether the on-demand is near or located in a restricted area.

At 458, it is determined whether the maximum speed of the on-demand electric vehicle needs to be reduced. In some embodiments, the maximum speed of the on-demand electric vehicle needs to be reduced in the event the on-demand electric vehicle is located in an area subject to a speed reduction. In some embodiments, the maximum speed of the on-demand electric vehicle needs to be reduced in the event the on-demand electric vehicle is located near a restricted area within a threshold distance.

The processor of the on-demand electric vehicle may compare the location data provided by the location device to the boundary coordinates included in the received configuration data to whether to reduce a maximum speed of the on-demand electric vehicle. In the event it is determined that the on-demand electric vehicle is near one of the one or more restricted areas within a threshold distance or in an area subject to a speed restriction, process 450 proceeds to 460. In the event it is determined that the on-demand electric vehicle is not near one of the one or more restricted areas within a threshold distance or in an area subject to a speed restriction, process 450 proceeds to 468.

At 460, a warning that indicates the on-demand electric vehicle is approaching a restricted area is provided. The on-demand electric vehicle may include a display and the warning may be displayed on the display. In some embodiments, the on-demand electric vehicle may include one or more lights and the one or more lights may flash as a warning to the user. In some embodiments, the processor of the on-demand electric vehicle is coupled to a mobile device associated with a user of the on-demand electric vehicle. The warning may be provided to the mobile device associated with the user. In some embodiments, the warning is an audible warning. In some embodiments, the on-demand electric vehicle includes a projection device and the warning is projected onto the ground via the projection device. Step 460 may be optional.

At 462, a speed reduction of the on-demand electric vehicle is caused. A processor of the on-demand electric vehicle may reduce a maximum speed associated with the on-demand electric vehicle while the on-demand electric vehicle is located within a threshold distance of a boundary of a restricted area or in an area subject to a speed restriction. For example, the processor of the on-demand electric vehicle may reduce the maximum speed associated with the on-demand electric vehicle by reducing the maximum amount of voltage, current, or power given to an electric motor of the on-demand electric vehicle.

At 464, it is determined whether the on-demand electric vehicle is in one of the one or more restricted areas. The on-demand electric vehicle may be determine to be in a restricted area based on the location data provided by a location device of the on-demand electric vehicle. A processor of the on-demand electric vehicle may compare the location data with coordinate information associated with the boundary of a restricted area. In the event it is determined that the on-demand electric vehicle is in one of the one or more restricted areas, process 450 proceeds to 466. In the event it is determined that the on-demand electric vehicle is not in one of the one or more restricted areas, process 450 proceeds to 468.

At 466, a warning that indicates the on-demand electric vehicle is in a restricted area is provided. The on-demand electric vehicle may include a display and the warning may be displayed on the display. In some embodiments, the on-demand electric vehicle may include one or more lights and the one or more lights may flash as a warning to the user. In some embodiments, the processor of the on-demand electric vehicle is coupled to a mobile device associated with a user of the on-demand electric vehicle. The warning may be provided to the mobile device associated with the user. In some embodiments, the warning is an audible warning. In some embodiments, the on-demand electric vehicle includes a projection device and the warning is projected onto the ground via the projection device. Step 466 may be optional.

At 468, an operation of the on-demand electric vehicle is restricted in the restricted area. For example, the maximum speed of the on-demand electric vehicle may be reduced to 0 mph, which causes the user of the on-demand electric vehicle to get off the on-demand electric vehicle and walk the on-demand electric vehicle out of the restricted area. The processor of the on-demand electric vehicle may prevent the power source of the on-demand electric vehicle from providing voltage, current, or power given to the electric motor of the on-demand electric vehicle.

At 470, operation of the on-demand electric vehicle is maintained. The on-demand electric vehicle may be able to operate until a user of the on-demand electric vehicle has ended the user's rental.

At 472, it is determined if a rental of the rented on-demand electric vehicle has ended. A user associated with the rented on-demand electric vehicle may use the application associated with the on-demand electric vehicle provider to indicate that a rental of the rented on-demand electric vehicle has ended. In response to the indication, the application associated with the on-demand electric vehicle provider may cause the mobile device on which the application is installed to provide a notification that the rental has ended to the backend server. In some embodiments, the on-demand electric vehicle includes an interface that allows a user of the on-demand electric vehicle to indicate that the rental has ended. In response to receiving an interaction that indicates the rental has ended, the on-demand electric vehicle may be configured to provide a notification that the rental has ended to the backend server.

In the event it is determined that the rental of the rented on-demand electric vehicle has ended, process 450 proceeds to 474. In the event it is determined that the rental of the rented on-demand electric vehicle has not ended, process 450 returns to 456.

At 474, a database is updated. The database may be updated to indicate the rented on-demand electric vehicle is now available for rental. The database may be updated to indicate the rented on-demand electric vehicle is now available for charging. The database may be updated to indicate the rented on-demand electric vehicle is now available for rebalancing.

The backend server may provide a user interface in the application associated with the on-demand electric vehicle provider. The user interface may be updated based on the updated database information. For example, a potential rider may see via the application user interface that the rented on-demand electric vehicle is now available for rental. A potential charger may see via the application user interface that the rented on-demand electric vehicle is now available for charging. A potential rebalancer may see via the application user interface that the rented on-demand electric vehicle is now available for re-location.

Figure 5A:
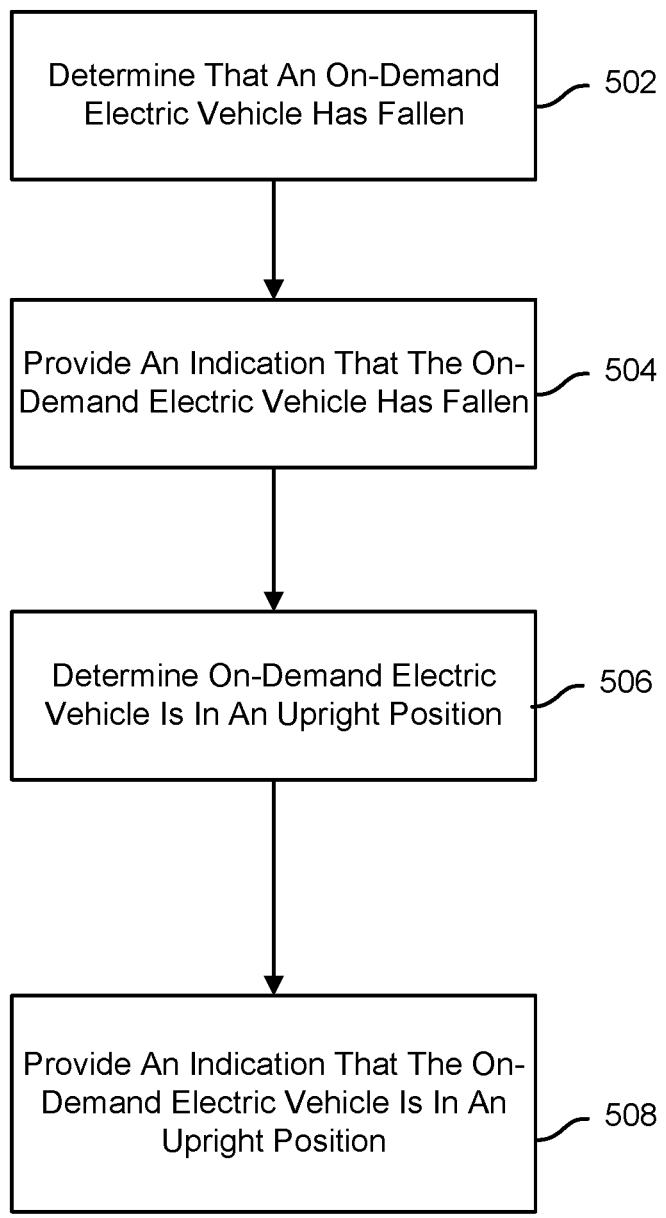
FIG. 5A is a flow chart illustrating an embodiment of a process to maintain on-demand electric vehicles in an upright position.

FIG. 5A is a flow chart illustrating an embodiment of a process to maintain on-demand electric vehicles in an up-right position. In the example shown, process 500 may be implemented by an electric vehicle, such as electric scooter 102. After a user has finished a rental of the electric vehicle, the electric vehicle may be placed in an upright position. The user may provide photographic evidence to an on-demand electric vehicle provider to demonstrate that the on-demand electric vehicle was left in an up-right position. At some moment in time later, the electric vehicle may be tipped over (either accidentally or on-purpose). The electric vehicle may remain in a fallen position until someone fixes the position of the fallen electric vehicle (i.e., place the fallen electric vehicle in an upright position). Fallen electric vehicles may be viewed as a nuisance because they may be blocking sidewalks, pathways, or doorways.

At 502, it is determined that an on-demand electric vehicle has fallen. The on-demand electric vehicle may include an orientation sensor, a tilt sensor, and/or an acceleration sensor. In some embodiments, the orientation sensor outputs a value that indicates that the on-demand electric vehicle is no longer in an up-right position. In some embodiments, the tilt sensor outputs a value that indicates that the on-demand electric vehicle is no longer in an up-right position. In some embodiments, the acceleration sensor outputs a value that indicates that the on-demand electric vehicle is no longer in an up-right position. For example, the acceleration sensor may output one or more values while the on-demand electric vehicle is transitioning from an up-right position to a fallen position.

At 504, an indication that the on-demand electric vehicle has fallen is provided. The indication may be provided from the on-demand electric vehicle to a backend server (e.g., backend serer 112) that is configured to monitor the up-right status associated with a fleet of on-demand electric vehicles. In some embodiments, the indication includes an output of an orientation sensor. In some embodiments, the indication includes an output of the acceleration sensor. In some embodiments, the indication includes an output of the tilt sensor. In some embodiments, the indication includes a notification that the on-demand electric vehicle is no longer in an up-right position.

In response to the indication, the backend server may update a user interface that indicates a location of one or more fallen electric vehicles. A fixer via the fixer's mobile device may view corresponding locations associated with one or more fallen electric vehicles. Each fallen electric vehicle may have a corresponding incentive. Examples of incentives include money, credits to use electric vehicles associated with the electric vehicle provider, credits to use at a goods provider (e.g., retail provider, food provider, etc.), credits to use at a service provider (e.g., free car wash, free house cleaning, etc.), etc. A fixer may select to fix the fallen on-demand electric vehicle.

At 506, it is determined that the on-demand electric vehicle is in an upright positon is determined. For example, a fixer may have corrected an orientation of an electric vehicle from a fallen position to an up-right position. In some embodiments, the orientation sensor outputs a value that indicates that the on-demand electric vehicle is in an up-right position. In some embodiments, the tilt sensor outputs a value that indicates that the on-demand electric vehicle is in an up-right position. In some embodiments, the acceleration sensor outputs a value that indicates that on-demand electric vehicle is in an up-right position. For example, the acceleration sensor may output one or more values while the on-demand electric vehicle is transitioning from a fallen position to an up-right position.

At 508, an indication that the electric vehicle is in an upright position is provided. The indication may be provided from the on-demand electric vehicle to a backend server that is configured to monitor the up-right status associated with a fleet of on-demand electric vehicles. In some embodiments, the indication includes an output of an orientation sensor. In some embodiments, the indication includes an output of the acceleration sensor. In some embodiments, the indication includes an output of the tilt sensor. In some embodiments, the indication includes a notification that the on-demand electric vehicle is in an up-right position. In response to the indication, the backend server may provide to the fixer an incentive associated with the fallen on-demand electric vehicle.

Figure 5B:
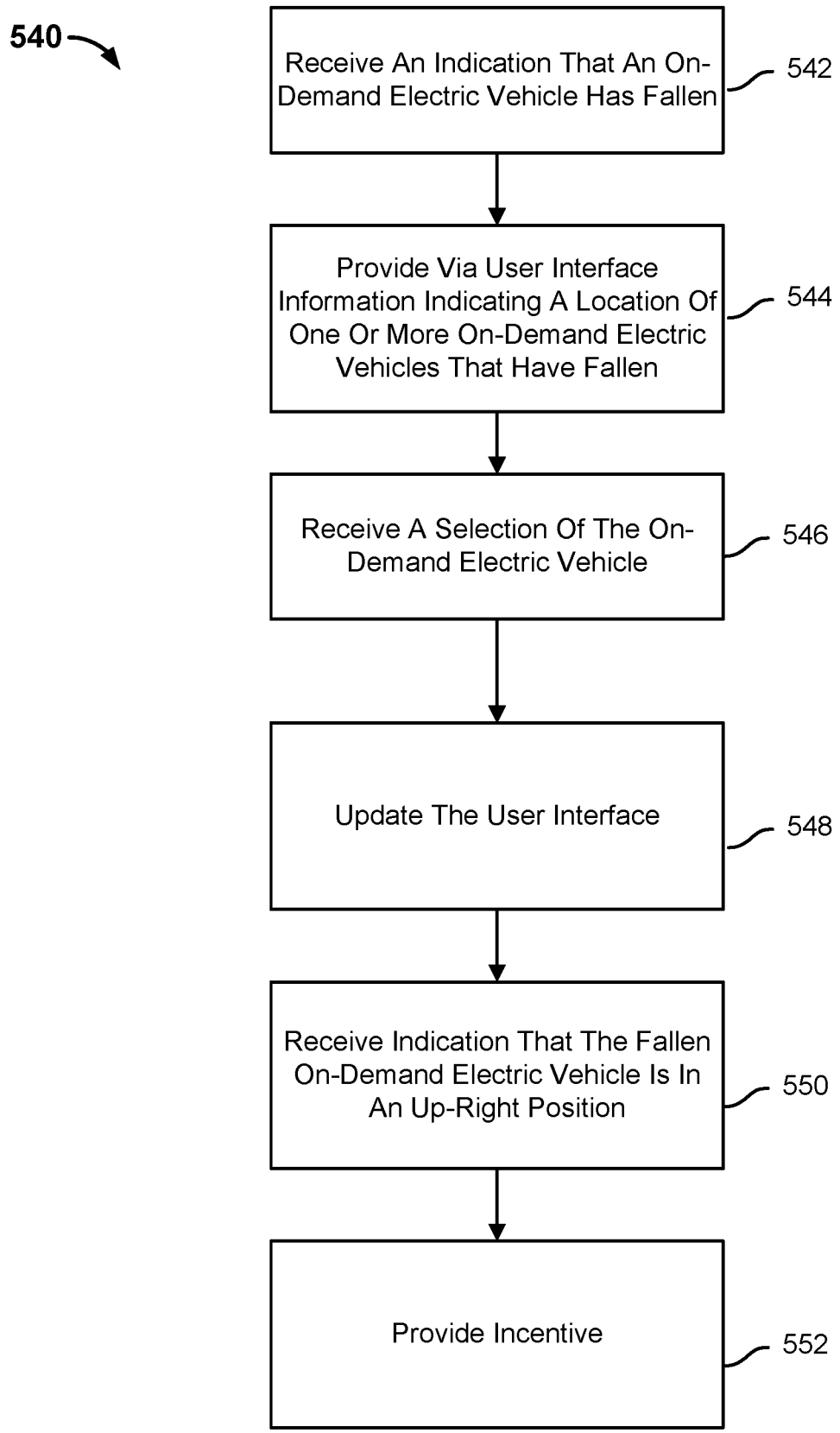
FIG. 5B is a flow chart illustrating an embodiment of a process to maintain on-demand electric vehicles in an upright position.

FIG. 5B is a flow chart illustrating an embodiment of a process to maintain on-demand electric vehicles in an up-right position. In the example shown, process 540 may be implemented by a backed server, such as backend server 112.

At 542, an indication that an on-demand electric vehicle has fallen is received. The indication may be received from the on-demand electric vehicle. An on-demand electric vehicle may include one or more sensors. One of the sensors may be an orientation sensor. The indication may include an output of the orientation sensor. The orientation sensor output may include data that indicates that the on-demand electric vehicle is no longer in an upright position. One of the sensors may be a tilt sensor. The indication may include an output of the tilt sensor. The tilt sensor output may include data that indicates that the on-demand electric vehicle is no longer in an upright position. One of the sensors may be an acceleration sensor. The indication may include an output of the acceleration sensor. The acceleration sensor output may include data that indicates that the on-demand electric vehicle is no longer in an upright position.

In some embodiments, the on-demand electric vehicle has determined that it is no longer in an upright positon based on data from the one or more sensors. The on-demand electric vehicle may provide an indication that notifies the backend server that the on-demand electric vehicle is no longer in an upright position. The indication may include location data associated with the on-demand electric vehicle.

At 544, information indicating a location of one or more on-demand electric vehicles that have fallen is provided via a user interface. The backed server may update a user interface that indicates a location of one or more fallen electric vehicles. A fixer via the fixer's mobile device may view corresponding locations associated with one or more fallen electric vehicles. Each fallen electric vehicle may have a corresponding incentive. Examples of incentives include money, credits to use electric vehicles associated with the electric vehicle provider, credits to use at a goods provider (e.g., retail provider, food provider, etc.), credits to use at a service provider (e.g., free car wash, free house cleaning, etc.), etc. The information may be provided on a map or a list.

At 546, a selection of the on-demand electric vehicle is received. A fixer may select the on-demand electric vehicle via a user interface of the application associated with the on-demand electric vehicle provider that is installed on the fixer's mobile device.

At 548, the user interface is updated to indicate that the on-demand electric vehicle has been selected. The user interface may display a plurality of fallen on-demand electric vehicles. The user interface may be updated such that the selected on-demand electric vehicle is no longer shown. This may prevent one or more other fixers from selecting the selected fallen on-demand electric vehicle.

At 550, an indication that the fallen on-demand electric vehicle is in an up-right position is received. The indication may be received from the on-demand electric vehicle. In some embodiments, the indication includes an output of an orientation sensor. In some embodiments, the indication includes an output of the acceleration sensor. In some embodiments, the indication includes an output of the tilt sensor. In some embodiments, the indication includes a notification that the on-demand electric vehicle is in an up-right position.

In some embodiments, the indication is received from an application associated with the on-demand electric vehicle provider. The application may include a feature that allows the fixer to use a camera of the mobile device to capture an image of the fallen electric vehicle in an upright position. The image may be sent from the fixer's mobile device to the backend server.

At 552, an incentive corresponding to the fallen on-demand electric vehicle is provided to the fixer.

Figure 5C:
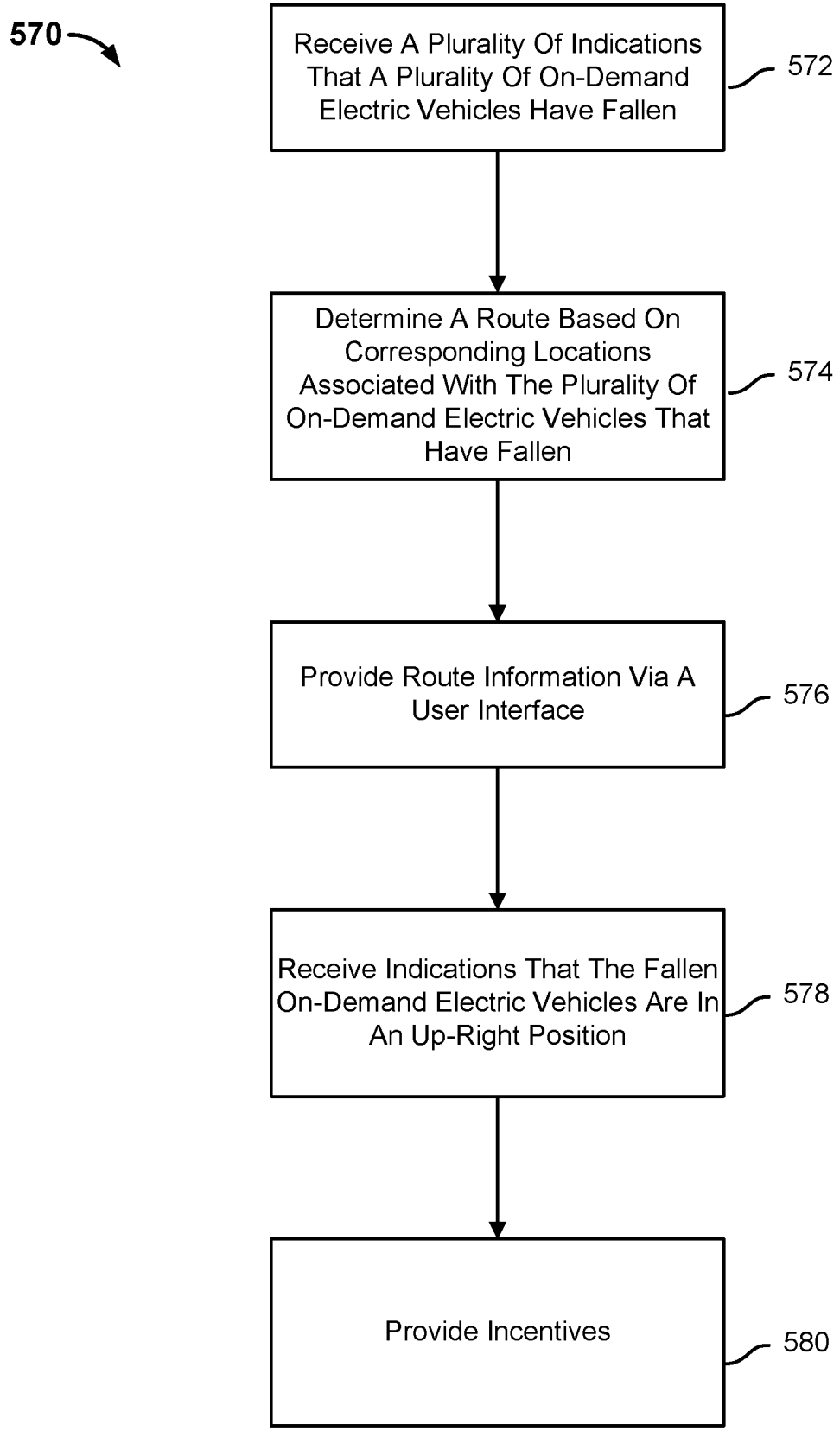
FIG. 5C is a flow chart illustrating an embodiment of a process to maintain on-demand electric vehicles in an upright position.

FIG. 5C is a flow chart illustrating an embodiment of a process to maintain on-demand electric vehicles in an up-right position. In the example shown, process 570 may be implemented by a backed server, such as backend server 112.

At 572, a plurality of indications that a plurality of on-demand electric vehicles have fallen are received. An on-demand electric vehicle may include one or more sensors. One of the sensors may be an orientation sensor. The indication may include an output of the orientation sensor. The orientation sensor output may include data that indicates that the on-demand electric vehicle is no longer in an upright position. One of the sensors may be a tilt sensor. The indication may include an output of the tilt sensor. The tilt sensor output may include data that indicates that the on-demand electric vehicle is no longer in an upright position. One of the sensors may be an acceleration sensor. The indication may include an output of the acceleration sensor. The acceleration sensor output may include data that indicates that the on-demand electric vehicle is no longer in an upright position.

In some embodiments, the on-demand electric vehicle has determined that it is no longer in an upright positon based on data from the one or more sensors. The on-demand electric vehicle may provide an indication that notifies the backend server that the on-demand electric vehicle is no longer in an upright position. The indication may include location data associated with the on-demand electric vehicle.

At 574, a route is determined based on corresponding locations associated with the plurality of on-demand electric vehicles that have fallen. A fixer may have selected the plurality of on-demand electric vehicles. In other embodiments, a fixer (e.g., an employee of the on-demand electric vehicle provider) is assigned to fix an orientation of the plurality of on-demand electric vehicles. The route may indicate an order in which the plurality of on-demand electric vehicles are to be serviced.

At 576, route information is provided via a user interface to a fixer. An application associated with the on-demand electric vehicle provider may provide a user interface that indicates a location of a plurality of fallen on-demand electric vehicles. The route information may be provided via the application associated with the on-demand electric vehicle provider.

At 578, indications that the fallen on-demand electric vehicles are in an up-right position are received. Corresponding indications may be received from each of the plurality of fallen on-demand electric vehicles. In some embodiments, an indication includes an output of an orientation sensor of a fallen on-demand electric vehicle. In some embodiments, the indication includes an output of a tilt sensor of a fallen on-demand electric vehicle. In some embodiments, the indication includes an output of the acceleration sensor of a fallen on-demand electric vehicle. In some embodiments, the indication includes a notification that the on-demand electric vehicle is in an up-right position.

In some embodiments, the indication is received from an application associated with the on-demand electric vehicle provider. The application may include a feature that allows the fixer to use a camera of the mobile device to capture an image of the fallen electric vehicle in an upright position. The image may be sent from the fixer's mobile device to the backend server.

At 580, incentives corresponding to the one or more fallen on-demand electric vehicles are provided to the user.

Figure 6A:
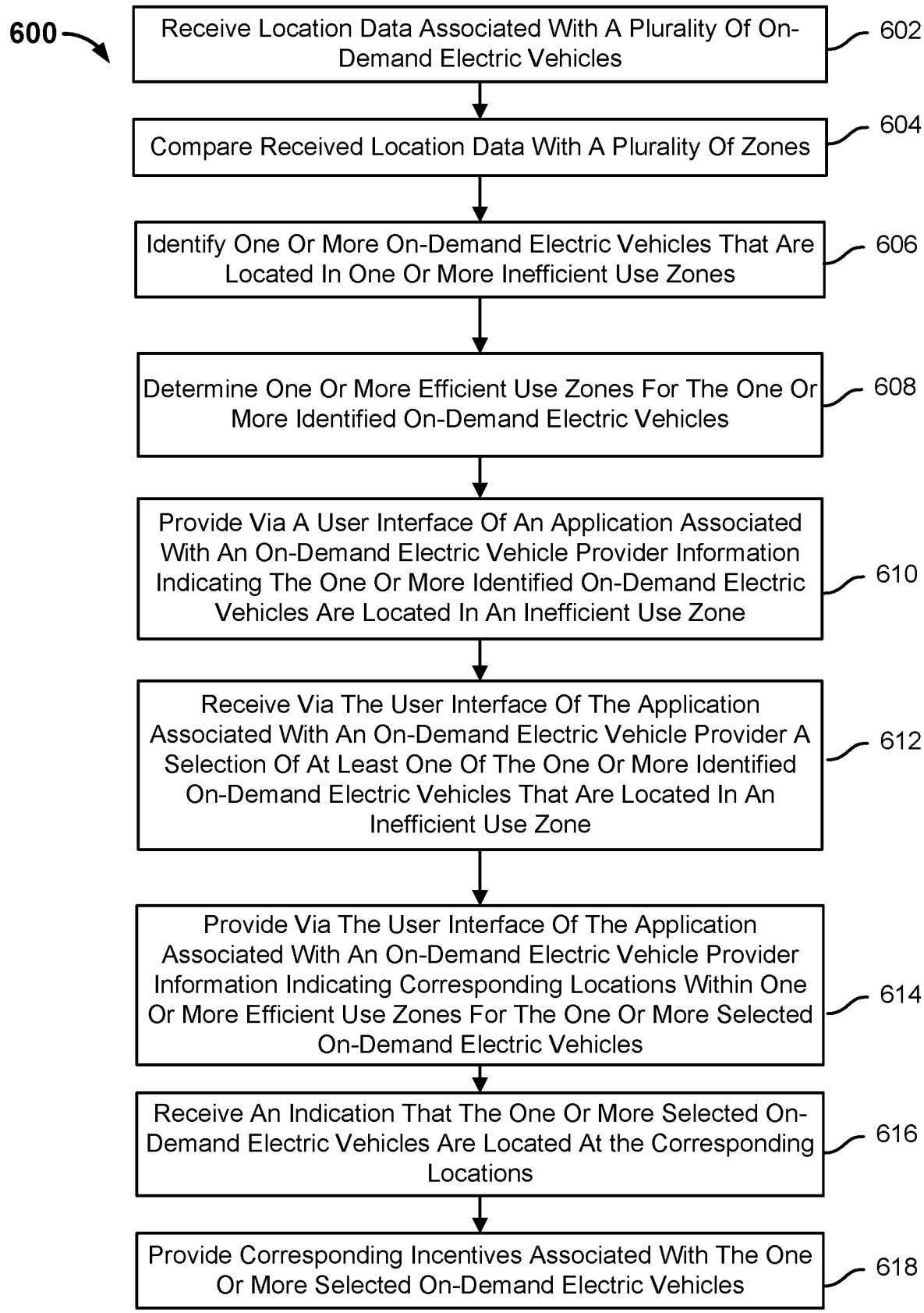
FIG. 6A is a flow chart illustrating an embodiment of a process to rebalance a plurality of on-demand electric vehicles.

FIG. 6A is a flow chart illustrating an embodiment of a process to rebalance a plurality of on-demand electric vehicles. In the example shown, process 600 may be implemented by a backed server, such as backend server 112. A backend server may maintain a map of on-demand electric vehicles included in a fleet of on-demand electric vehicles. The map may be updated when location data is received from any of the vehicles included in the fleet.

On-demand electric vehicles may not be tied to a particular docking station. This may allow a user to leave an on-demand electric vehicle at any location at the end of a rental. The location may be a sub-optimal location and may lead to an inefficient use of the on-demand electric vehicle because the on-demand electric vehicle may remain un-used until it is picked up and relocated to another location.

At 602, location data associated with a plurality of on-demand electric vehicles is received. When a user associated with an on-demand electric vehicle ends a rental, a notification may be provided to the backend server. The notification may include location data associated with the on-demand electric vehicle. The backend server may store the location data associated with an on-demand electric vehicle. The backend server may store the location data associated with plurality of on-demand electric vehicles available for rental.

At 604, the received location data is compared with a plurality of zones. The backend server may partition a map into a plurality of zones and may maintain the partitioned map. The map may be updated based on additional rental data associated with a fleet of electric vehicles. The plurality of zones may comprise one or more low-demand zones, one or more medium-demand zones, and one or more high-demand zones. A low-demand zone may be comprised of an area having a frequency of users below a first demand threshold. A medium-demand zone may be comprised of an area having a frequency of users greater than or equal to the first demand threshold and less than a second demand threshold. A high-demand zone may be comprised of an area having a frequency of users greater than or equal to the second demand threshold.

The plurality of zones may comprise one or more low-saturation zones, one or more medium-saturation zones, and one or more high-saturation zones. A low-saturation zone may be comprised of an area having a number of electric vehicles available for rental below a first saturation threshold. A medium-saturation zone may be comprised of an area having a number of electric vehicles available for rental greater than or equal to the first saturation threshold and less than a second saturation threshold. A high-saturation zone may be comprised of an area having a number of electric vehicles available for rental greater than or equal to the second saturation threshold.

The plurality of zones may comprise one or more low theft/vandalism zones, one or more medium theft/vandalism zones, and one or more high theft/vandalism zones. A low-theft/vandalism zone may be comprised of an area having a number of theft/vandalism incidents below a first theft/vandalism threshold. A medium-theft/vandalism zone may be comprised of an area having a number of theft/vandalism incidents greater than or equal to the first theft/vandalism threshold and less than a second theft/vandalism threshold. A high-theft/vandalism zone may be comprised of an area having a number of theft/vandalism incidents greater than or equal to the second theft/vandalism threshold. The plurality of demand zones, saturation zones, and theft/vandalism zones may overlap.

At 606, one or more on-demand electric vehicles that are located in one or more inefficient use zones are identified. A location of an on-demand electric vehicle may be compared with a boundary associated with an inefficient use zone. An inefficient use zone may be a low-demand zone, a high-saturation zone, or a high-theft/vandalism zone.

At 608, one or more efficient use zones for the one or more identified on-demand electric vehicles is determined. An efficient use zone may be a medium-demand zone, high-demand zone, low-saturation zone, medium-saturation zone, low-theft/vandalism zone, or medium-theft/vandalism zone. An efficient use zone for the one or more identified on-demand electric vehicles may be a zone that is closest to the inefficient use zone in which the on-demand electric vehicle is currently situated. An efficient use zone for the one or more identified on-demand electric vehicles may be a zone with the highest probability of the one or more identified on-demand electric vehicles being rented.

At 610, information indicating the one or more identified on-demand electric vehicles are located in a low-demand zone is provided via a user interface of an application associated with an on-demand electric vehicle provider. A rebalancer may have installed on the rebalancer's mobile device, an application associated with the on-demand electric vehicle provider. The application may provide a user interface that indicates corresponding locations of the one or more identified on-demand electric vehicles. The information may include the corresponding locations and corresponding incentives.

At 612, a selection of at least one of the one or more identified on-demand electric vehicles that are located in an inefficient use zone is received via the user interface of the application associated with the on-demand electric vehicle provider.

At 614, information indicating corresponding locations within one or more efficient use zones for the one or more selected on-demand electric vehicles is provided via the user interface of the application associated with the on-demand electric vehicle provider.

At 616, an indication that the one or more selected on-demand electric vehicles are located at the corresponding locations is received. In some embodiments, the indication is received from an application associated with the on-demand electric vehicle provider. The application may include a feature that allows the rebalancer to use a camera of the mobile device to capture an image of the re-located electric vehicle at the new location. The image may be sent from the rebalancer's mobile device to the backend server. The image may include metadata that indicates a location at which the image was taken. In some embodiments, an on-demand electric vehicle is configured to periodically provide location data to the backend server. In some embodiments, the application is configured to access location data of the mobile device on which the application is installed and to provide the accessed location data.

At 618, corresponding incentives associated with the one or more selected on-demand electric vehicles are provided to the rebalancer.

Figure 6B:
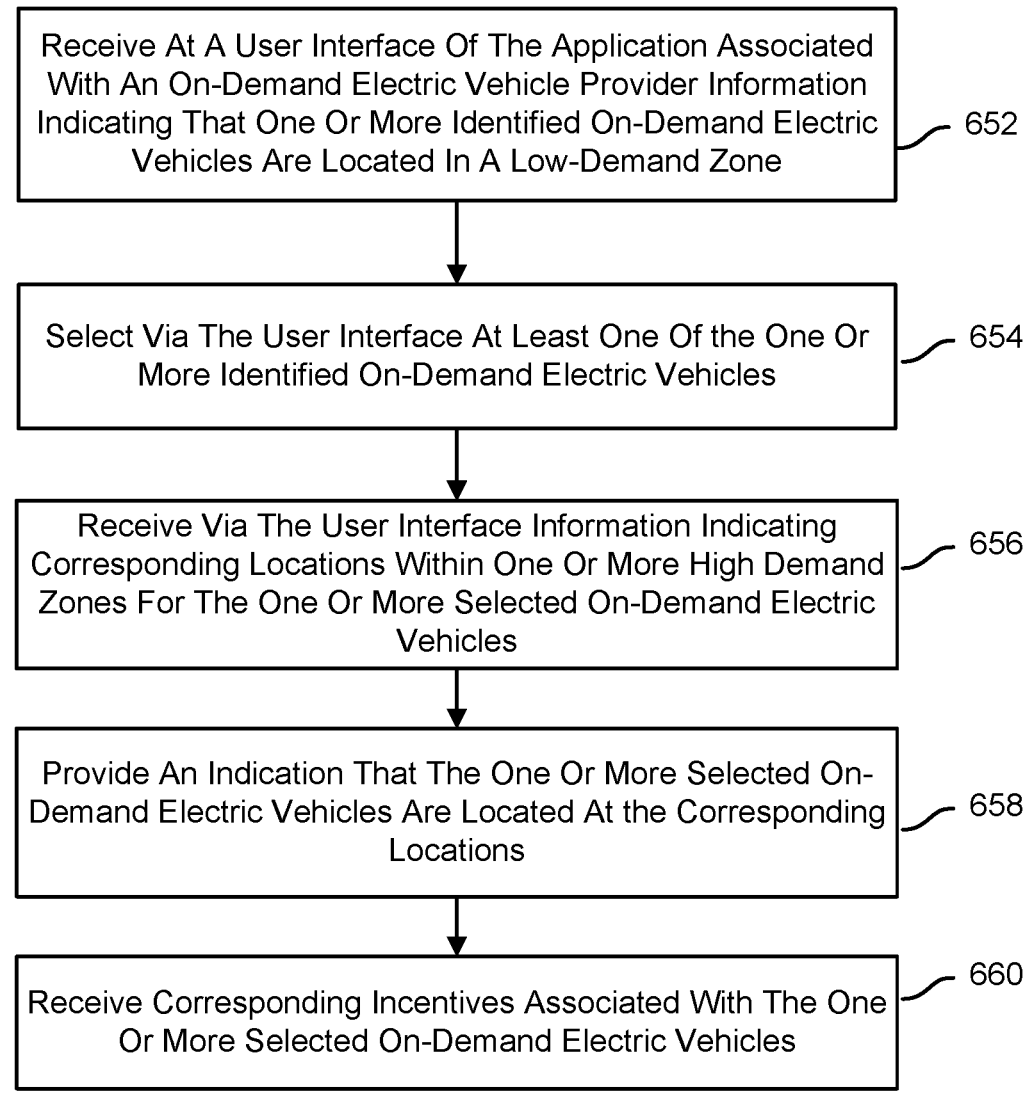
FIG. 6B is a flow chart illustrating an embodiment of a process to rebalance a plurality of on-demand electric vehicles.

FIG. 6B is a flow chart illustrating an embodiment of a process to rebalance a plurality of on-demand electric vehicles. In the example shown, process 550 may be implemented by an application installed on a mobile device, such as an application installed on mobile devices 108a, 108n.

At 652, information indicating that one or more identified on-demand electric vehicles are located in an inefficient use zone is received at a user interface of an application associated with an on-demand electric vehicle provider. The information may include the corresponding locations and corresponding incentives.

At 654, at least one of the one or more identified on-demand electric vehicles is selected via the user interface of an application associated with an on-demand electric vehicle provider.

At 656, information indicating corresponding locations within one or more efficient use zones for the one or more selected on-demand electric vehicles is received via the user interface of an application associated with an on-demand electric vehicle provider.

At 658, an indication that the one or more selected on-demand electric vehicles are located at the corresponding locations is provided. The application may include a feature that allows the rebalancer to use a camera of the mobile device to capture an image of the relocated electric vehicle. The image may be sent from the rebalancer's mobile device to the backend server. The image may include metadata that indicates a location at which the image was taken. In some embodiments, an on-demand electric vehicle is configured to periodically provide location data to the backend server. In some embodiments, the application is configured to access location data of the mobile device on which the application is installed and to provide the accessed location data.

At 660, corresponding incentives associated with the one or more selected on-demand electric vehicles are received by the rebalancer. For example, an indication may be received via the application user interface that funds in the amount of the incentive have been credited and/or paid to the rebalancer.

Figure 7:
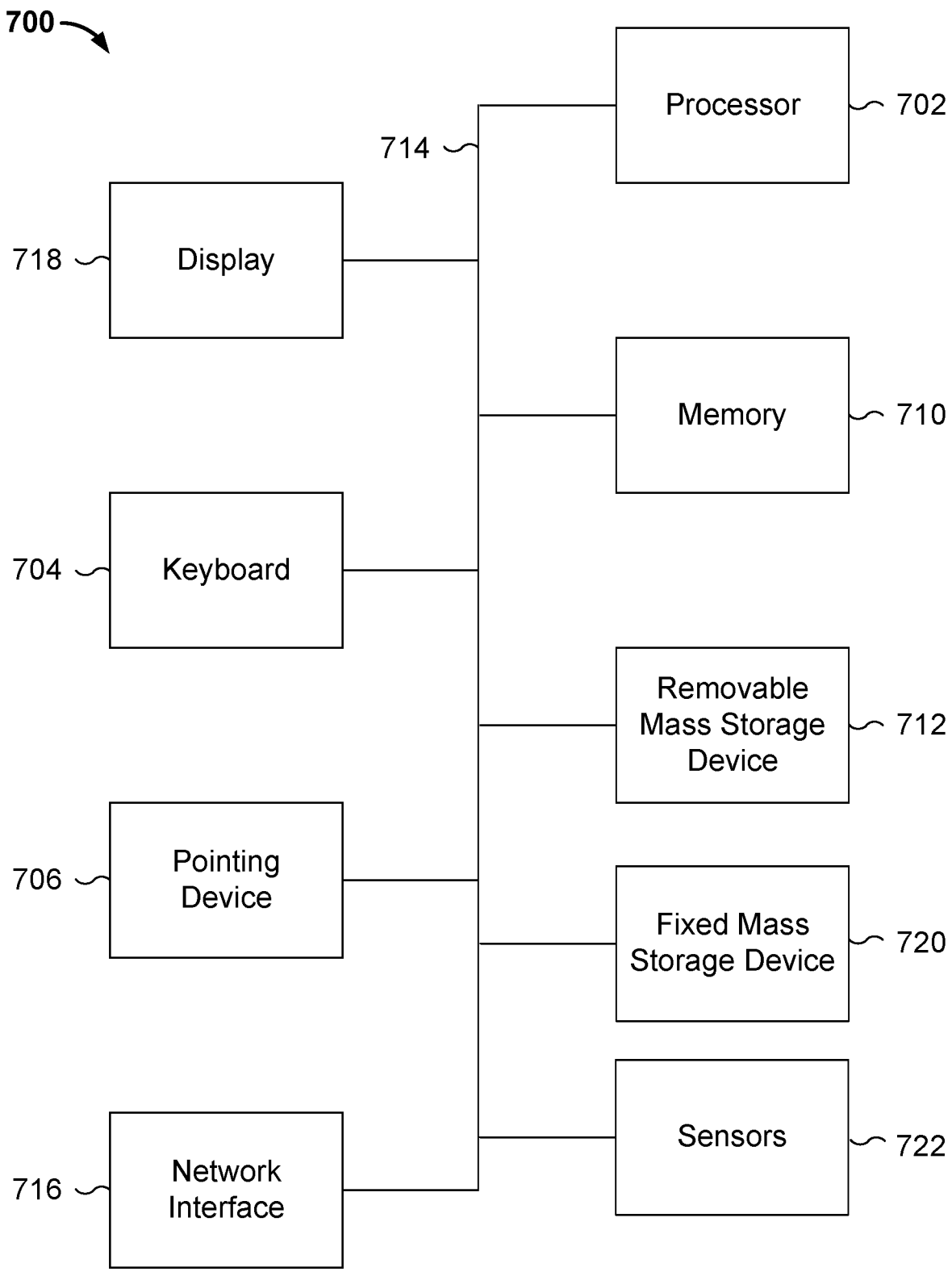
FIG. 7 is a block diagram illustrating a computer system in accordance with some embodiments.

FIG. 7 is a functional diagram illustrating a computer system in accordance with some embodiments. Computing system 700 may be implemented as a computer system, such as computer system 108a, 108n. Computer system 700, which includes various subsystems as described below, includes at least one microprocessor subsystem, also referred to as a processor or a central processing unit ("CPU") 702. For example, processor 702 can be implemented by a single-chip processor or by multiple cores and/or processors. In some embodiments, processor 702 is a general purpose digital processor that controls the operation of the computer system 700. Using instructions retrieved from memory 710, the processor 702 controls the reception and manipulation of input data, and the output and display of data on output devices, for example display 718.

Processor 702 is coupled bi-directionally with memory 710, which can include a first primary storage, typically a random access memory ("RAM"), and a second primary storage area, typically a read-only memory ("ROM"). Configuration data associated with an on-demand electric vehicle may be stored in memory 710, removable mass storage 712, or fixed mass storage 720. As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions, for example programmed instructions. For example, primary storage devices 710 can include any suitable computer-readable storage media, described below, depending on whether, for example, data access needs to be bi-directional or uni-directional. For example, processor 702 can also directly and very rapidly retrieve and store frequently needed data in a cache memory, not shown.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712, 720 can be incorporated, if needed, in standard fashion as part of primary storage 710, for example RAM, as virtual memory.

In addition to providing processor 702 access to storage subsystems, bus 714 can be used to provide access to other subsystems and devices as well. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, trackpad, or tablet, and is useful for interacting with a graphical user interface.

The network interface 716 allows processor 702 to be coupled to another computer, computer network, or telecommunications network using a network connection as shown. For example, through the network interface 716, the processor 702 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 702 can be used to connect the computer system 700 to an external network and transfer data according to standard protocols. For example, various process embodiments disclosed herein can be executed on processor 702, or can be performed across a network such as the Internet, intranet networks, or local area networks in conjunction with a remote processor that shares a portion of the processing. Throughout this specification, "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 702 through network interface 716.

An auxiliary I/O device interface, not shown, can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example, a script that can be executed using an interpreter.

Computer system 700 may comprise one or more sensors 722. The one or more sensors 722 may be configured to measure orientation, acceleration, tilt, and/or location (e.g., gyroscope, accelerometer, inclinometer, clinometer, GPS, etc.).

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine dynamically during a ride that a location associated with an on-demand electric vehicle is associated with one or more restrictions; and
use configuration data to enforce the one or more restrictions with respect to operation of the on-demand electric vehicle in connection with the ride;
determine whether a rental associated with the on-demand electric vehicle has ended;
update a database in response to the rental associated with the on-demand electric vehicle ending; and
a communication interface coupled to the processor, wherein the communication interface is configured to receive an indication that the on-demand electric vehicle has fallen.

2. The system of claim 1, wherein the processor is further configured to determine the location associated with the on-demand electric vehicle.

3. The system of claim 1, wherein the one or more restrictions include a restricted area.

4. The system of claim 1, wherein the one or more restrictions include an area subject to a speed restriction.

5. The system of claim 1, wherein the configuration data includes maximum speed data associated with the one or more restrictions.

6. The system of claim 4, wherein to use the configuration data, the processor is configured to apply the configuration data to modify a configuration of the on-demand electric vehicle.

7. The system of claim 1, wherein the communication interface is configured to receive an indication of the rental associated with the on-demand electric vehicle.

8. The system of claim 1, wherein the indication includes data associated with one or more sensors of the on-demand electric vehicle.

9. The system of claim 8, wherein the processor is configured to provide via a user interface information indicating that the on-demand electric vehicle is in a fallen position.

10. The system of claim 9, wherein the communication interface is configured to receive a selection of the on-demand electric vehicle and the processor is configured to update information provided by the user interface based on the received selection.

11. The system of claim 10, wherein the communication interface is configured to receive an indication that the selected fallen on-demand electric vehicle is in an up-right position and the processor is configured to provide an incentive associated with the selected fallen on-demand electric vehicle.

12. The system of claim 1 wherein the communication interface is configured to receive location data associated with the on-demand electric vehicle and the processor is configured to:
compare the received location data associated with the on-demand electric vehicle with one or more inefficient use zones; and
determine that the on-demand electric vehicle is located in an inefficient use zone.

13. The system of claim 12, wherein the one or more inefficient use zones include at least one of a low demand zone, an high-saturation zone, or a high theft/vandalism zone.

14. The system of claim 12, wherein the processor is further configured to determine one or more efficient use zones for the on-demand electric vehicle.

15. The system of claim 14, wherein the processor is further configured to:
provide via a user interface information indicating that the on-demand electric vehicle is located in an inefficient use zone;
receive via the user interface a selection of the on-demand electric vehicle; and
provide via the user interface a location of one or more efficient use zones for the on-demand electric vehicle.

16. The system of claim 15, wherein the communication interface is configured to receive an indication that the on-demand electric vehicle is located in one of the one or more efficient use zones and the processor is configured to provide an incentive associated with the on-demand electric vehicle.

17. A method, comprising:
determining dynamically during a ride that a location associated with an on-demand electric vehicle is associated with one or more restrictions;
using configuration data to enforce the one or more restrictions with respect to operation of the on-demand electric vehicle in connection with the ride;
determining whether a rental associated with the on-demand electric vehicle has ended;
updating a database in response to the rental associated with the on-demand electric vehicle ending; and
receiving an indication that the on-demand electric vehicle has fallen.

18. A computer program product, the computer program product being embodied in a non-transitory computer readable storage medium and comprising computer instructions for:
determining dynamically during a ride that a location associated with an on-demand electric vehicle is associated with one or more restrictions;
using configuration data to enforce the one or more restrictions with respect to operation of the on-demand electric vehicle during the ride;
determining whether a rental associated with the on-demand electric vehicle has ended;
updating a database in response to the rental associated with the on-demand electric vehicle ending; and
receiving an indication that the on-demand electric vehicle has fallen.

* * * * *

UNITED STATES PATENT AND TRADEMARK OFFICE
CERTIFICATE OF CORRECTION

PATENT NO. : 11,263,690 B2
APPLICATION NO. : 16/544537
DATED : March 1, 2022
INVENTOR(S) : Travis VanderZanden and William Scott Rushforth It is certified that error appears in the above-identified patent and that said Letters Patent is hereby corrected as shown below:

On the Title Page

Column 2, item (56), other publications, cite no. 1, delete "Electric Scooter Sharing Service Makes Its Way to DC" and insert --"Electric Scooter Sharing Service Makes Its Way to DC--, therefor.
Column 2, item (56), other publications, cite no. 1, delete "Electric Scooter Sharing Service Makes Its Way to DC" and insert --Electric Scooter Sharing Service Makes Its Way to DC"--, therefor.
In page 2, Column 2, item (56), U.S. patent documents, cite no. 20, delete "Stanfield" and insert --Stanfield et al.--, therefor.

In the Specification

In Column 4, Line(s) 48, delete "e.g," and insert --e.g.,--, therefor.
In Column 5, Line(s) 63, delete "positon" and insert --position--, therefor.
In Column 8, Line(s) 1, delete "sever" and insert --server--, therefor.
In Column 8, Line(s) 3, delete "sever" and insert --server--, therefor.
In Column 9, Line(s) 47, delete "sever" and insert --server--, therefor.
In Column 21, Line(s) 50, delete "serer" and insert --server--, therefor.
In Column 22, Line(s) 5, delete "positon" and insert --position--, therefor.
In Column 22, Line(s) 55, delete "positon" and insert --position--, therefor.
In Column 23, Line(s) 62, delete "positon" and insert --position--, therefor.

In the Claims

In Column 30, Line(s) 12, Claim 13, after "zone," delete "an" and insert --a--, therefor.

Signed and Sealed this
Thirtieth Day of August, 2022

Katherine Kelly Vidal
*Director of the United States Patent and Trademark Office*